United States Patent
Machida

(10) Patent No.: US 9,642,102 B2
(45) Date of Patent: May 2, 2017

(54) WIRELESS BASE STATION, WIRELESS COMMUNICATION SYSTEM, AND TRANSMISSION POWER CONTROL METHOD

(71) Applicant: FUJITSU LIMITED, Kawasaki-shi, Kanagawa (JP)

(72) Inventor: Mamoru Machida, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 106 days.

(21) Appl. No.: 14/295,720

(22) Filed: Jun. 4, 2014

(65) Prior Publication Data
US 2014/0287677 A1    Sep. 25, 2014

Related U.S. Application Data

(63) Continuation of application No. PCT/JP2011/078431, filed on Dec. 8, 2011.

(51) Int. Cl.
| | | |
|---|---|---|
| *H04W 64/00* | (2009.01) | |
| *H04W 16/26* | (2009.01) | |
| *H04W 52/28* | (2009.01) | |
| *H04W 52/36* | (2009.01) | |
| *H04W 52/46* | (2009.01) | |

(52) U.S. Cl.
CPC ......... *H04W 52/46* (2013.01); *H04W 64/00* (2013.01); *H04W 16/26* (2013.01); *H04W 52/283* (2013.01); *H04W 52/365* (2013.01)

(58) Field of Classification Search
CPC . H04W 52/283; H04W 52/365; H04W 52/46; H04W 84/047; H04W 52/38; H04W 52/10; H04W 40/22; H04B 7/15535; H04B 7/2606; H04B 7/15592; H04B 7/155; H04L 45/22

See application file for complete search history.

(56) References Cited

U.S. PATENT DOCUMENTS

| | | | |
|---|---|---|---|
| 7,558,535 B2 | 7/2009 | Cho et al. | |
| 7,907,915 B2 | 3/2011 | Cho et al. | |
| 8,285,319 B2 | 10/2012 | Shin et al. | |
| 8,644,876 B2 | 2/2014 | Shin et al. | |
| 2006/0083196 A1* | 4/2006 | Kilfoyle | H04B 7/15535 370/328 |
| 2009/0175214 A1* | 7/2009 | Sfar | H04B 7/15592 370/315 |

(Continued)

FOREIGN PATENT DOCUMENTS

| | | | |
|---|---|---|---|
| EP | 2501190 A1 | 9/2012 | |
| EP | 2525509 A1 | 11/2012 | |

(Continued)

OTHER PUBLICATIONS

Fukumoto et al, WO2011058991A1 , machine translated.*

(Continued)

*Primary Examiner* — Ping Hsieh
*Assistant Examiner* — James Yang
(74) *Attorney, Agent, or Firm* — Fujitsu Patent Center

(57) ABSTRACT

A second transmission power control different from a first transmission power control being performed on a first wireless terminal connected to a wireless base station without a relay station is performed on a second wireless terminal connected to the wireless base station through the relay station.

16 Claims, 20 Drawing Sheets

(56) References Cited

U.S. PATENT DOCUMENTS

| | | | |
|---|---|---|---|
| 2009/0185492 A1* | 7/2009 | Senarath | H04B 7/155 370/238 |
| 2010/0222051 A1 | 9/2010 | Watanabe et al. | |
| 2012/0230249 A1 | 9/2012 | Fukumoto et al. | |
| 2013/0210341 A1 | 8/2013 | Kiyoshima et al. | |

FOREIGN PATENT DOCUMENTS

| | | |
|---|---|---|
| JP | 2008-511201 | 4/2008 |
| JP | 2010-506494 | 2/2010 |
| JP | 2011-182002 | 9/2011 |
| JP | 2012-085058 | 4/2012 |
| WO | 2009011531 | 1/2009 |
| WO | 2009031184 | 3/2009 |
| WO | 2011058991 | 5/2011 |
| WO | 2011/087040 A1 | 7/2011 |

OTHER PUBLICATIONS

Nose et al, JP2011-182002, machine translated.*
3GPP, 3GPP ETSI TS 136 213 V8.7.0 (Jun. 2009).*
JPOA—Office Action mailed on Mar. 17, 2015 for corresponding Japanese Patent Application No. 2013-548024, with partial English translation of the relevant part.
EESR—Extended European Search Report mailed on Apr. 8, 2015 for corresponding European Patent Application No. 11877165.8.
International Search Report, mailed in connection with PCT/JP2011/078431 and mailed Jan. 31, 2012.

* cited by examiner

FIG. 5

| UPH[dB] | AREA DETERMINATION RESULT |
|---|---|
| LESS THAN 100 | BASE STATION AREA |
| 100 OR MORE | RELAY STATION AREA |

FIG. 6

| AREA DETERMINATION RESULT | AVAILABLE RANGE OF TPC COMMAND | REMARKS |
|---|---|---|
| BASE STATION AREA | +3, +1, 0, −1 | NORMAL CLOSED-LOOP TRANSMISSION POWER CONTROL |
| RELAY STATION AREA | 0 | STOP CLOSED-LOOP TRANSMISSION POWER CONTROL IN PSEUDO MANNER |

FIG. 7

| AREA DETERMINATION RESULT | TARGET SIR [dB] |
|---|---|
| BASE STATION AREA | 6 |
| RELAY STATION AREA | 0 |

FIG. 9

| CHANGE AMOUNT [dB] OF UPH | AREA DETERMINATION RESULT |
|---|---|
| LESS THAN 10 | AREA IS NOT CHANGED |
| 10 OR MORE | AREA IS CHANGED |

FIG. 11

| DELAY TIME [μ sec] | AREA DETERMINATION RESULT |
|---|---|
| LESS THAN 20 | BASE STATION AREA |
| 20 OR MORE | RELAY STATION AREA |

FIG. 13

| UPH[dB] | DELAY TIME [μ sec] | AREA DETERMINATION RESULT |
|---|---|---|
| LESS THAN 100 | LESS THAN 20 | BASE STATION AREA |
| LESS THAN 100 | 20 OR MORE | RELAY STATION AREA |
| 100 OR MORE | LESS THAN 20 | RELAY STATION AREA |
| 100 OR MORE | 20 OR MORE | RELAY STATION AREA |

FIG. 16

| x | y | CORRESPONDING AREA |
|---|---|---|
| X TO (X+15) | Y TO (Y+10) | BASE STATION AREA |
| X' TO (X'+10) | Y' TO (Y'+5) | RELAY STATION AREA |
| ... | ... | ... | ated
WIRELESS BASE STATION, WIRELESS COMMUNICATION SYSTEM, AND TRANSMISSION POWER CONTROL METHOD

CROSS-REFERENCE TO RELATED APPLICATION

This application is a continuation application of International Application PCT/JP2011/078431, filed on Dec. 8, 2011 and designated the U.S., the entire contents of which are incorporated herein by reference.

FIELD

The embodiments discussed herein are related to a wireless base station, a wireless communication system, a transmission power control method, and a wireless terminal. The wireless communication system includes, for example, a wireless system including a relay station configured to relay between a wireless base station and a wireless terminal.

BACKGROUND

As one of wireless communication systems, there is a wireless communication system including a relay station (repeater).

By relaying a wireless signal between a wireless base station and a wireless terminal by a relay station, it is possible to increase a wireless transmission distance or to extend a communication service area.

For example, when the relay station is installed at the edge of the communication service area of the wireless base station, since the relay station is operable to amplify and reradiate a radio wave from the wireless base station, it is possible to increase the wireless transmission distance or to extend the communication service area.

Further, in the wireless communication system, there are cases in which a transmission power control (TPC) is performed on wireless terminals in order to reduce interference between wireless signals and suppress battery consumption of the wireless terminal to thereby satisfy both maintaining of a communication quality and transmission power saving.

As one of transmission power control schemes, for example, there is a closed loop transmission power control (closed loop TPC) scheme.

In the closed loop transmission power control scheme, for example, a wireless base station controls a transmission power of a wireless terminal based on a signal to interference power ratio (SIR) related to a wireless signal received from the wireless terminal. Specifically, for example, the wireless base station controls the transmission power of the wireless terminal by transmitting a control command (TPC bit) to instruct an increase or decrease in a transmission power so that an SIR on the wireless signal received from the wireless terminal gets close to a target SIR to the wireless terminal.

Note that, as an existing technique related to a transmission power control, techniques of Patent Documents 1 to 3 listed below have been known.

For example, Patent Document 1 discloses a method in which a wireless base station switches multi-antenna communication schemes including a transmission power control method according to an estimation of a delay time of a feedback signal from a mobile station.

Further, Patent Document 2 discloses a method in which a wireless base station compensates for an error in a transmission power setting based on an SINR of user equipment (UE).

Furthermore, Patent Document 3 discloses a method in which a base station apparatus switches power control schemes based on a comparison between information related to a moving speed of a terminal and a predetermined threshold value.

Patent Document(s)

Patent Document 1: WO 2009/031184
Patent Document 2: JP 2010-506494 T
Patent Document 3: JP 2008-511201 T As described above, in the wireless communication system including the relay station, the communication service area can be extended by amplifying the wireless signal from the wireless base station or the wireless terminal and transmitting the amplified wireless signal to the wireless terminal or the wireless base station through the relay station.

However, there is a case in which the relay station amplifies an interference wave from a second communication service area as well as the wireless signal (desired wave) from the wireless terminal and relays them to the wireless base station.

In this case, the wireless base station may determine that the SIR on the wireless signal received from the wireless terminal through the relay station is smaller than the target SIR although the wireless signal from the wireless terminal is amplified through the relay station, and perform control such that the transmission power of the wireless terminal is increased.

At this time, since the wireless signal transmitted from the wireless terminal which is controlled to increase its transmission power by the wireless base station is amplified and relayed to the wireless base station by the relay station, the wireless signal has an extremely high power level and may give interference other service areas or other communication devices.

In addition, in this case, since the wireless terminal transmits the wireless signal at the transmission power greater than necessary, power consumption of the wireless terminal may increase.

SUMMARY (1) According to a first aspect, provided is a wireless base station of a wireless communication system including the wireless base station, a wireless terminal, and a relay station configured to relay a wireless signal transceived between the wireless base station and the wireless terminal, the wireless base station including a processor configured to perform a second transmission power control different from a first transmission power control, the first transmission power control being performed on a first wireless terminal connected to the wireless base station without involving the relay station, on a second wireless terminal connected to the wireless base station through the relay station and a transmitter configured to transmit a control message according to the second transmission power control to the second wireless terminal.

(2) According to a second aspect, provided is a wireless base station of a wireless communication system including the wireless base station, a wireless terminal, and a relay station configured to relay a wireless signal transceived between the wireless base station and the wireless terminal, the wireless base station including a processor configured to perform a second transmission power control different from a first transmission power control, the first transmission power control being performed on a first wireless terminal positioned in a first wireless area provided by the wireless base station, on a second wireless terminal positioned in a second wireless area provided by the relay station and a transmitter configured to transmit a control message according to the second transmission power control to the second wireless terminal.

(3) According to a third aspect, provided is a wireless communication system including a wireless base station, a wireless terminal, and a relay station configured to relay a wireless signal transceived between the wireless base station and the wireless terminal, wherein the wireless base station includes a first processor configured to perform a second transmission power control different from a first transmission power control, the first transmission power control being performed on a first wireless terminal connected to the wireless base station without involving the relay station, on a second wireless terminal connected to the wireless base station through the relay station, and a transmitter configured to transmit a control message according to the second transmission power control to the second wireless terminal, and the second wireless terminal includes a receiver configured to receive the control message transmitted from the transmitter, and a second processor configured to control a transmission power of the second wireless terminal based on the received control message.

(4) According to a fourth aspect, provided is a wireless communication system including a wireless base station, a wireless terminal, and a relay station configured to relay a wireless signal transceived between the wireless base station and the wireless terminal, wherein the wireless base station includes a first processor configured to perform a second transmission power control different from a first transmission power control, the first transmission power control being performed on a first wireless terminal positioned in a first wireless area provided by the wireless base station, on a second wireless terminal positioned in a second wireless area provided by the relay station, and a transmitter configured to transmit a control message according to the second transmission power control to the second wireless terminal, and the second wireless terminal includes a receiver configured to receive the control message transmitted from the transmitter, and a second processor configured to control a transmission power of the second wireless terminal based on the received control message.

(5) According to a fifth aspect, provided is a transmission power control method of a wireless base station in a wireless communication system including the wireless base station, a wireless terminal, and a relay station configured to relay a wireless signal transceived between the wireless base station and the wireless terminal, the method including performing a second transmission power control different from a first transmission power control, the first transmission power control being performed on a first wireless terminal connected to the wireless base station without involving the relay station, on a second wireless terminal connected to the wireless base station through the relay station and transmitting a control message according to the second transmission power control to the second wireless terminal.

(6) According to a sixth aspect, provided is a transmission power control method of a wireless base station in a wireless communication system including the wireless base station, a wireless terminal, and a relay station configured to relay a wireless signal transceived between the wireless base station and the wireless terminal, the method including performing a second transmission power control different from a first transmission power control, the first transmission power control being performed on a first wireless terminal positioned in a first wireless area provided by the wireless base station, on a second wireless terminal positioned in a second wireless area provided by the relay station and transmitting a control message according to the second transmission power control to the second wireless terminal.

(7) According to a seventh aspect, provided is a wireless terminal of a wireless communication system including a wireless base station, a wireless terminal, and a relay station configured to relay a wireless signal transceived between the wireless base station and the wireless terminal, the wireless terminal including a receiver configured to receive a control message according to a second transmission power control different from a first transmission power control, the first transmission power control being performed on a second wireless terminal connected to the wireless base station without involving the relay station, from the wireless base station during a communication with the wireless base station through the relay station and a controller configured to perform a power control based on the control message received by the receiver during the communication with the wireless base station through the relay station.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram for describing an exemplary area determination method according to an embodiment.

FIG. 6 is a diagram for describing an exemplary transmission power control performed according to an area determination result.

FIG. 7 is a diagram for describing an exemplary transmission power control performed according to an area determination result.

FIG. 9 is a diagram for describing an exemplary area determination method according to a first modified example.

FIG. 11 is a diagram for describing according to an exemplary area determination method according to a second modified example.

FIG. 13 is a diagram for describing an exemplary area determination method according to a third modified example.

FIG. 16 is a diagram for describing an exemplary area determination method according to the fourth modified example.

DESCRIPTION OF EMBODIMENTS

Hereinafter, exemplary embodiments of the present invention will be described with reference to the appended drawings. The following embodiments are merely an example, and not intended to exclude applications of various changes or techniques that are not explicitly described in the following embodiments and modified examples. In other words, the following embodiments and modified examples can be variously modified and carried out within the scope not departing from the subject matter of the present invention.

[1] Exemplary Embodiments (1.1) Wireless Communication System

Figure 1:
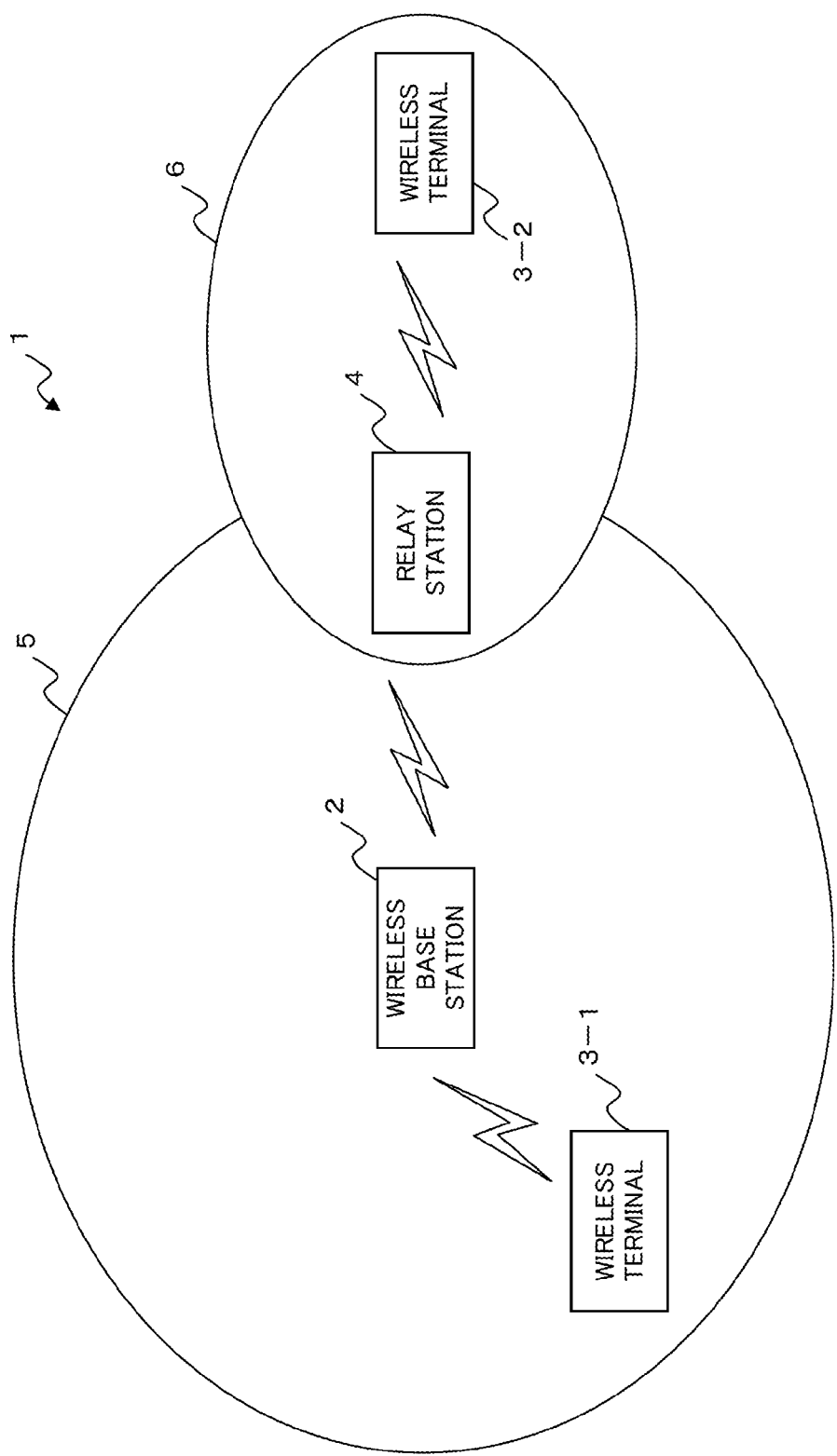
FIG. 1 is a diagram illustrating an exemplary configuration of a wireless communication system according to an embodiment of the present invention.

FIG. 1 is a diagram illustrating an exemplary configuration of a wireless communication system according to an embodiment.

A wireless communication system 1 illustrated in FIG. 1 includes, for example, a wireless base station 2, wireless terminals 3-1 and 3-2, and a relay station 4. In the following, when the wireless terminals 3-1 and 3-2 need not be distinguished from each other, they are simply referred to as a "wireless terminal 3." Further, the wireless terminal 3 refers to as a mobile communication device, and is the same in meaning as user equipment (UE), a wireless mobile terminal, or a mobile station (MS). Furthermore, the number of the wireless base stations 2, the number of the wireless terminals 3, and the number of the relay stations 4 are not limited to numbers illustrated in FIG. 1.

The wireless base station 2 provides a communication service area 5 configured with a cell or a sector, and can perform wireless communication with the wireless terminal 3-1 or the relay station 4 positioned within the communication service area 5. In the following, the communication service area 5 provided by the wireless base station 2 may be simply referred to as a "base station area 5."

For example, the wireless base station 2 can wirelessly and directly communicate with the wireless terminal 3-1 positioned within the base station area 5 provided by its own station 2 over an access link. Further, the wireless base station 2 can wirelessly and directly communicate with the relay station 4 positioned within the base station area 5 provided by its own station 2 over a relay link.

In other words, the wireless terminal 3-1 can wirelessly and directly communicate with the wireless base station 2, which provides the communication service area 5 in which its own station 3-1 is positioned, over the access link.

Meanwhile, it is unavailable for the wireless base station 2 to perform direct wireless communication with the wireless terminal 3-2 in the state illustrated in FIG. 1. It is because the wireless terminal 3-2 is not positioned within the base station area 5 provided by the wireless base station 2.

The relay station 4 is positioned within the base station area 5 and is available to wirelessly communicate with the wireless base station 2. Meanwhile, the relay station 4 provides a communication service area 6 and is available to wirelessly communicate with the wireless terminal 3-2 positioned within the communication service area 6. In the following, the communication service area 6 provided by the relay station 4 may be simply referred to as a "relay station area 6."

The relay station 4 amplifies and relays a wireless signal transceived between the wireless base station 2 and the wireless terminal 3-2. For this, in the example illustrated in FIG. 1, the relay station 4 is arranged at the edge of the base station area 5 in order to extend the communication service area of the wireless communication system 1. The relay station 4 may be fixedly arranged at a predetermined position or may be movable. When the relay station 4 is configured as a mobile station, the relay station area 6 provided by the relay station 4 is also movable.

For example, the relay station 4 is available to amplify the wireless signal received from the wireless base station 2 and to relay and transmit the amplified wireless signal to the wireless terminal 3-2 positioned within the relay station area 6 provided by its own station 4 over the access link. Further, the relay station 4 is available to amplify the wireless signal received from the wireless terminal 3-2 positioned within the relay station area 6 provided by its own station 4 and to relay and transmit the amplified wireless signal to the wireless base station 2 over the relay link.

In other words, the wireless terminal 3-2 is available to indirectly and wirelessly communicate with the wireless base station 2 through the relay station 4 that provides the communication service area 6 in which its own station 3-2 is positioned.

Next, exemplary configurations of the wireless terminal 3, the relay station 4, and the wireless base station 2 will be described. The exemplary configurations of the wireless terminal 3, the relay station 4, and the wireless base station 2 are merely an example, and the present invention is not limited to configurations described below.

(1.2) Exemplary Configuration of Wireless Terminal 3

Figure 2:
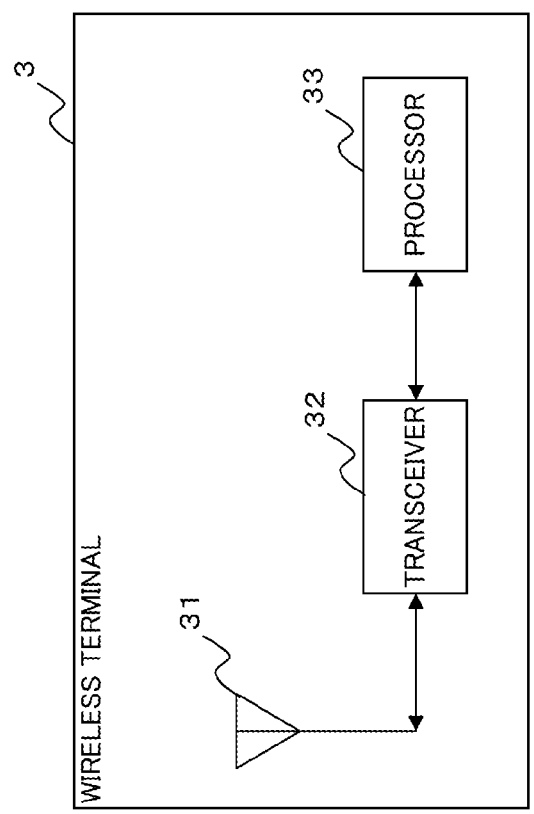
FIG. 2 is a diagram illustrating an exemplary configuration of a wireless terminal illustrated in FIG. 1.

FIG. 2 is a diagram illustrating an exemplary configuration of the wireless terminal 3 according to an embodiment.

The wireless terminal 3 illustrated in FIG. 2 includes, for example, an antenna 31, a transceiver 32, and a processor 33.

The antenna 31 receives a wireless signal. Examples of the wireless signal received through the antenna 31 include a wireless signal transmitted from the wireless base station 2 or a wireless signal transmitted from the relay station 4. Further, the antenna 31 transmits a wireless signal. The wireless signal transmitted through the antenna 31 is received by, for example, the wireless base station 2 or the relay station 4.

In the example illustrated in FIG. 2, the antenna 31 has a function of a reception antenna and a function of a transmission antenna and is commonly used by an antenna duplexer which is not illustrated, but the wireless terminal 3 may include a receiving antenna and a transmitting antenna separately.

The transceiver 32 converts a radio-frequency signal received through the antenna 31 into a baseband signal, and converts a generated baseband signal into a radio-frequency signal and transmits the radio-frequency signal through the antenna 31.

In other words, the transceiver 32 functions as an example of a receiver configured to receive a control message (which will be described later) transmitted from the wireless base station 2.

The processor 33 performs various kinds of processes in the wireless terminal 3. For example, the processor 33 is operable to perform a control according to the control message extracted by the transceiver 32.

In other words, the processor 33 functions as an example of a second processor (controller) configured to control a transmission power of its own station 3 based on the control message received during communication with the wireless base station 2 through the relay station 4.

Specifically, for example, the processor 33 is operable to perform the transmission power control of its own station 3 based on the control command (TPC bit) transmitted from the wireless base station 2.

Further, the processor 33 is operable to control the transmission power of its own station 3, for example, based on reception power of a reference signal such as a pilot signal (reference signal received power (RSRP)) transmitted from the wireless base station 2. This transmission power control scheme may be called a closed loop transmission power control scheme.

Further, the processor 33 is operable to activate various kinds of applications, for example, based on user data transmitted from the wireless base station 2 to perform a screen display or a video or audio reproduction process of the wireless terminal 3.

Further, the processor 33 may have a function of measuring the position of its own station 3 based on radio waves received from global positioning system (GPS) satellites.

Further, the processor 33 is operable to control radio resources or perform overall control of the wireless terminal 3. For example, the processor 33 may have a radio resource control (RRC) connection control function of performing paging and establishing or releasing (disconnecting) a call, a measurement control function of managing and reporting measurement, a mobility control function of performing connection switching control such as handover or reselection, and the like.

(1.3) Exemplary Configuration of Relay Station 4

For example, in a wireless communication system of a long term evolution-advanced (LTE-A) scheme, it is considered that installation of the relay station 4 configured to relay a wireless signal transceived between the wireless terminal 3 and the wireless base station 2.

The LTE-A scheme is discussed on the premise of compatibility with the LTE scheme, and in order to allow the wireless terminal 3 of the LTE scheme to be connected to the relay station 4 of the LTE-A scheme, the relay station 4 is designed so that, for the wireless terminal 3 of the LTE scheme, the relay station 4 of the LTE-A scheme is not considered as one different from the wireless base station 2 of the LTE scheme (the relay station 4 can be considered as the same one of the wireless base stations 2).

The relay stations 4 are classified into an amplify and forward (AF) type relay station that simply amplifies and transmits a received signal and a decode and forward (DF) type relay station that demodulates and decodes a received signal and then performs reconstruction of data such as user multiplexing or demultiplexing, and then encodes, modulates, and transmits a resultant signal.

In the present example, the AF type relay station that is cheaper and smaller in relay processing delay than the DF type relay station is assumed to be used as the relay station 4. In the wireless communication system 1 using the AF type relay station, the wireless base station 2 and the wireless terminal 3 have the advantages being capable of performing communication without being aware of the relay station 4 and avoiding a complicated communication control operation. However, the present invention is not limited to this example, and the DF type relay station may be used as the relay station 4.

Figure 3:
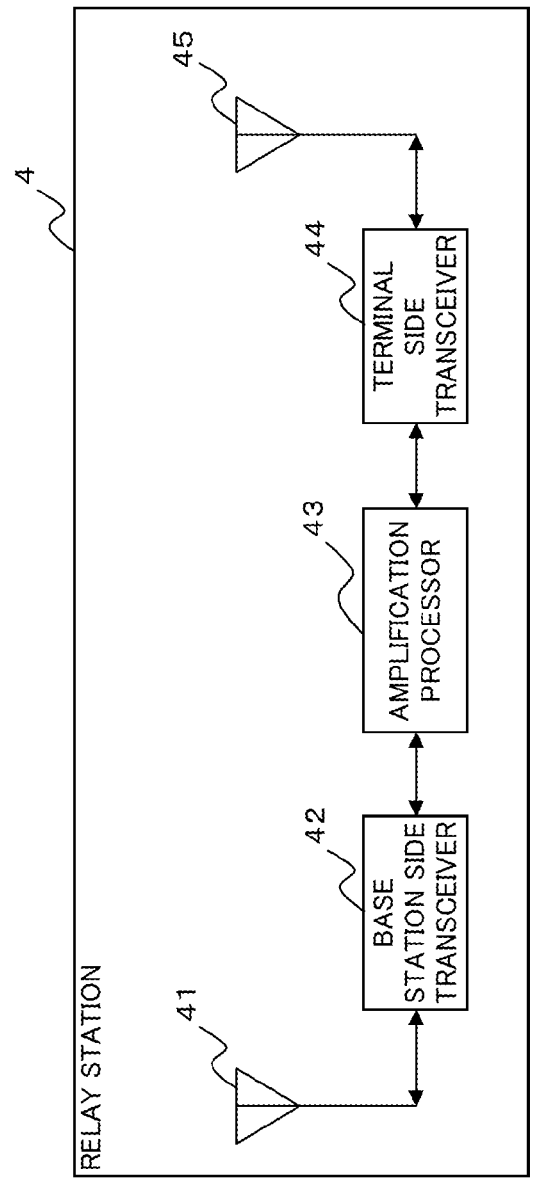
FIG. 3 is a diagram illustrating an exemplary configuration of a relay station illustrated in FIG. 1.

FIG. 3 is a diagram illustrating an exemplary configuration of the relay station 4 according to an embodiment.

The relay station 4 illustrated in FIG. 3 includes, for example, abase station directed antenna 41, abase station directed transceiver 42, an amplification processor 43, a terminal directed transceiver 44, and a terminal directed antenna 45.

The base station directed antenna 41 receives a wireless signal from the wireless base station 2 and transmits a wireless signal to the wireless base station 2.

The base station directed transceiver 42 converts a radio-frequency signal received through the base station directed antenna 41 into a baseband signal, and converts a generated baseband signal into a radio-frequency signal and transmits the radio-frequency signal through the base station directed antenna 41.

Further, the terminal directed antenna 45 receives a wireless signal from the wireless terminal 3 and transmits a wireless signal to the wireless terminal 3.

The terminal directed transceiver 44 converts a radio-frequency signal received through the terminal directed antenna 45 into a baseband signal, and converts a generated baseband signal into a radio-frequency signal and transmits the radio-frequency signal through the terminal directed antenna 45.

The amplification processor 43 amplifies the baseband signal converted by the base station directed transceiver 42 and transmits the amplified signal to the terminal directed transceiver 44, and amplifies the baseband signal converted by the terminal directed transceiver 44 and transmits the amplified signal to the base station directed transceiver 42.

(1.4) Exemplary Configuration of Wireless Base Station 2

Figure 4:
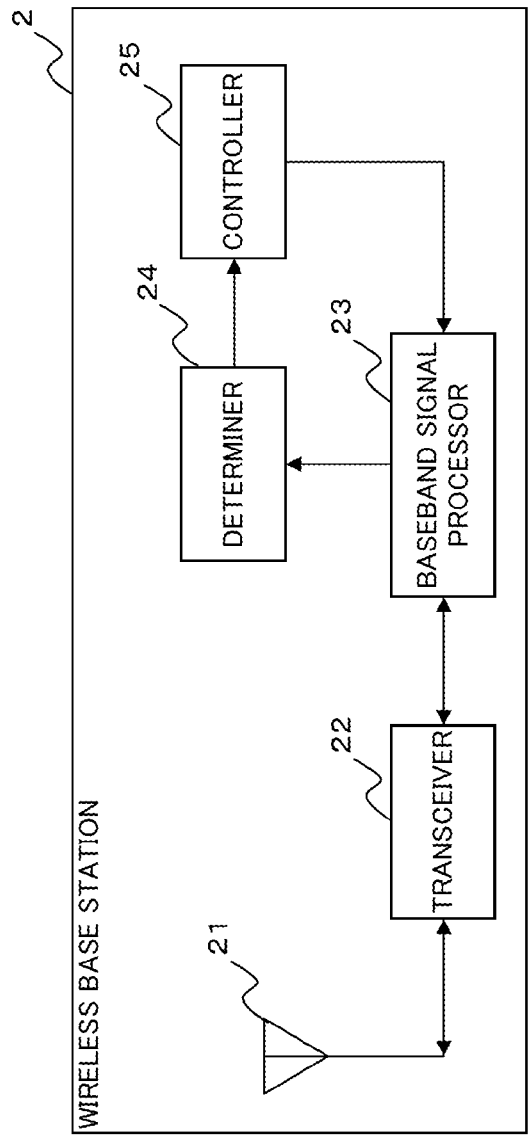
FIG. 4 is a diagram illustrating an exemplary configuration of a wireless base station illustrated in FIG. 1.

FIG. 4 is a diagram illustrating an exemplary configuration of the wireless base station 2 according to an embodiment.

The wireless base station 2 illustrated in FIG. 4 includes, for example, an antenna 21, a transceiver 22, a baseband signal processor 23, a determiner 24, and a controller 25.

The antenna 21 receives a wireless signal. Examples of the wireless signal received through the antenna 21 include a wireless signal transmitted from the wireless terminal 3 or a wireless signal transmitted from the relay station 4. The antenna 21 transmits a wireless signal. The wireless signal transmitted through the antenna 21 is received, for example, by the wireless terminal 3 or the relay station 4.

In the example illustrated in FIG. 4, the antenna 21 has a function of a reception antenna and a function of a transmission antenna and is commonly used by an antenna duplexer which is not illustrated, but the wireless base station 2 may include a reception antenna and a transmission antenna separately.

The transceiver 22 converts a radio-frequency signal received through the antenna 21 into a baseband signal, and converts a generated baseband signal into a radio-frequency signal and transmits the radio-frequency signal through the antenna 21.

The baseband signal processor 23 acquires various kinds of information from the transmission signal of the wireless terminal 3, and notifies the determiner 24 or the controller 25 of the acquired information. Specifically, for example, the baseband signal processor 23 is operable to acquire uplink power headroom (UPH) that is an example of information related to the transmission power of the wireless terminal 3 from the transmission signal of the wireless terminal 3, and to notify the determiner 24 of the UPH. The UPH is information representing a ratio of a current transmission power to a maximum transmission power of the wireless terminal 3, that is, information representing remaining transmission power of the wireless terminal 3, and is calculated based on the RSRP by the wireless terminal 3.

Further, the baseband signal processor 23 is operable to measure a reception level (uplink-signal to interference power ratio (UL-SIR)) of a signal transmitted from the wireless terminal 3 and to notify the controller 25 of the measured reception level.

Further, the baseband signal processor 23 is operable to add control information received from the controller 25 in a signal to be transmitted to the wireless terminal 3 and to transmit the resultant signal to the wireless terminal 3 through the transceiver 22 and the antenna 21. The control information from the controller 25 includes, for example, a TPC command or the like.

The determiner 24 determines whether the wireless terminal 3 is connected to its own station 2 without involving the relay station 4 or the wireless terminal 3 is connected to its own station 2 through the relay station 4, for example, based on the UPH notified from the baseband signal processor 23. In other words, the determiner 24 determines whether an area (which may be referred to as a "serving area" of the wireless terminal 3) in which the wireless terminal 3 is positioned is in the base station area 5 or in the relay station area 6.

Here, a determination method performed by the determiner 24 will be described with reference to FIG. 5.

Generally, the wireless signal transmitted from the wireless terminal 3 positioned within the base station area 5 needs to arrive at the wireless base station 2 without being subjected to the amplification process by the relay station 4, and thus the transmission power of the wireless terminal 3 is required to have a relatively large value. For this, the remaining power of the transmission power of the wireless terminal 3 positioned within the base station area 5 is relatively small, and the UPH reported to the wireless base station 2 from the wireless terminal 3 has a relatively small value. Meanwhile, the wireless signal transmitted from the wireless terminal 3 positioned within the relay station area 6 is subjected to the amplification process by the relay station 4 and then arrives at the wireless base station 2, and thus the transmission power of the wireless terminal 3 may have a relatively small value. For this, the remaining power of the transmission power of the wireless terminal 3 positioned within the relay station area 6 is relatively large, and the UPH reported to the wireless base station 2 from the wireless terminal 3 has a relatively large value.

In this regard, for example, the determiner 24 is operable to compare the UPH value reported from the wireless terminal 3 with a predetermined threshold value (a first threshold value), to determine that the serving area of the wireless terminal 3 is in the base station area 5 when the UPH is less than the threshold value, and to determine that the serving area of the wireless terminal 3 is in the relay station area 6 when the UPH is equal to or larger than the threshold value.

In the example illustrated in FIG. 5, for example, the determiner 24 determines that the serving area of the wireless terminal 3 is in the base station area 5 when the UPH value reported from the wireless terminal 3 is less than 100 [dB], and determines that the serving area of the wireless terminal 3 is in the relay station area 6 when the UPH value is 100 [dB] or more.

Further, the determination result of the determiner 24 is notified to the controller 25.

The controller 25 performs the transmission power control according to the determination result of the determiner 24 on the wireless terminal 3.

In other words, the determiner 24 and the controller 25 function as an example of a first processor configured to perform a second transmission power control different from a first transmission power control, the first transmission power control being performed on the wireless terminal 3-1 connected to its own station 2 without involving the relay station 4, on the wireless terminal 3-2 connected to its own station 2 through the relay station 4.

In other words, the determiner 24 and the controller 25 function as an example of the first processor configured to perform the second transmission power control different from the first transmission power control, the first transmission power control being performed on the wireless terminal 3-1 positioned in the base station area 5 (first wireless area) provided by its own station 2, on the wireless terminal 3-2 positioned in the relay station area 6 (second wireless area) provided by the relay station 4.

Further, the antenna 21 and the transceiver 22 function as an example of a transmitter configured to transmit the control message according to the second transmission power control to the wireless terminal 3-2.

Further, the antenna 21, the transceiver 22, and the baseband signal processor 23 function as an example of a receiver configured to receive the wireless signal transmitted from the wireless terminal 3.

Specifically, for example, the controller 25 performs the normal closed loop transmission power control (the first transmission power control) on the wireless terminal 3 which is determined as being positioned within the base station area 5 by the determiner 24 as illustrated in FIG. 6. At this time, for example, the TPC command transmitted from the wireless base station 2 to the wireless terminal 3 has any one of values of "+3," "+1," "0," and "−1." The wireless terminal 3 performs control such that the transmission power of its own station 3 is increased, maintained, or reduced according to the value of the TPC command received from the wireless base station 2. For example, when the TPC command of "+3" is received from the wireless base station 2, the wireless terminal 3 may increase the transmission power of its own station 3 by three predetermined step sizes. Similarly, for example, the wireless terminal 3 may increase the transmission power of its own station 3 by one predetermined step size when the TPC command of "+1" is received from the wireless base station 2. The wireless terminal 3 may maintain the transmission power of its own station 3 when the TPC command of "0" is received from the wireless base station 2. The wireless terminal 3 may reduce the transmission power of its own station 3 by one predetermined step size when the TPC command of "−1" is received from the wireless base station 2. Meanwhile, the controller 25 stops the closed loop transmission power control in a pseudo manner (performs the second transmission power control) on the wireless terminal 3 which is determined as being positioned within the relay station area 6 by the determiner 24 as illustrated in FIG. 6. In other words, the controller 25 is operable to stop the closed loop transmission power control in the pseudo manner by transmitting the TPC command fixed to the value of "0" to the wireless terminal 3 regardless of the UL-SIR value or the target SIR value.

Alternatively, the controller 25 sets the target SIR to a normal value (for example, 6 [dB]) and performs the closed loop transmission power control (the first transmission power control) on the wireless terminal 3 which is determined as being positioned within the base station area 5 by the determiner 24 as illustrated in FIG. 7. Meanwhile, the controller 25 sets the target SIR to a value (for example, 0 [dB]) smaller than the normal value and performs the closed loop transmission power control (the second transmission power control) on the wireless terminal 3 which is determined as being positioned within the relay station area 6 by the determiner 24 as illustrated in FIG. 7. In other words, the controller 25 is operable to perform control such that the transmission power of the wireless terminal 3 is not excessively increased by setting the target SIR on the wireless terminal 3 positioned within the relay station area 6 to a small value.

As described above, according to the present example, the second transmission power control having a characteristic of producing less transmission power increase relative to the first transmission power control performed on the wireless terminal 3-1 (that is, the wireless terminal 3-1 connected to the wireless base station 2 without involving the relay station 4) determined as being positioned within the base station area 5 can be performed on the wireless terminal 3-2 (that is, the wireless terminal 3-2 connected to the wireless base station 2 through the relay station 4) determined as being positioned within the relay station area 6.

As a result, since it is possible to prevent the transmission power of the wireless terminal 3-2 from being increased to a value greater than necessary, even when the transmission signal from the wireless terminal 3-2 is amplified and relay-transmitted by the relay station 4, it is possible to suppress interference on a surrounding area or a device therearound. Further, since the transmission power of the wireless terminal 3-2 connected to the wireless base station 2 through the relay station 4 is not increased to a value greater than necessary, it is also possible to reduce the power consumption of the wireless terminal 3-2 as well.

(1.5) Exemplary Operation of Wireless Communication System 1

Here, an exemplary operation of the wireless communication system 1 will be described with reference to FIG. 8. In the example illustrated in FIG. 8, the relay station 4 is not illustrated, but communication between the wireless base station 2 and the wireless terminal 3-2 is relayed through the relay station 4.

Figure 8:
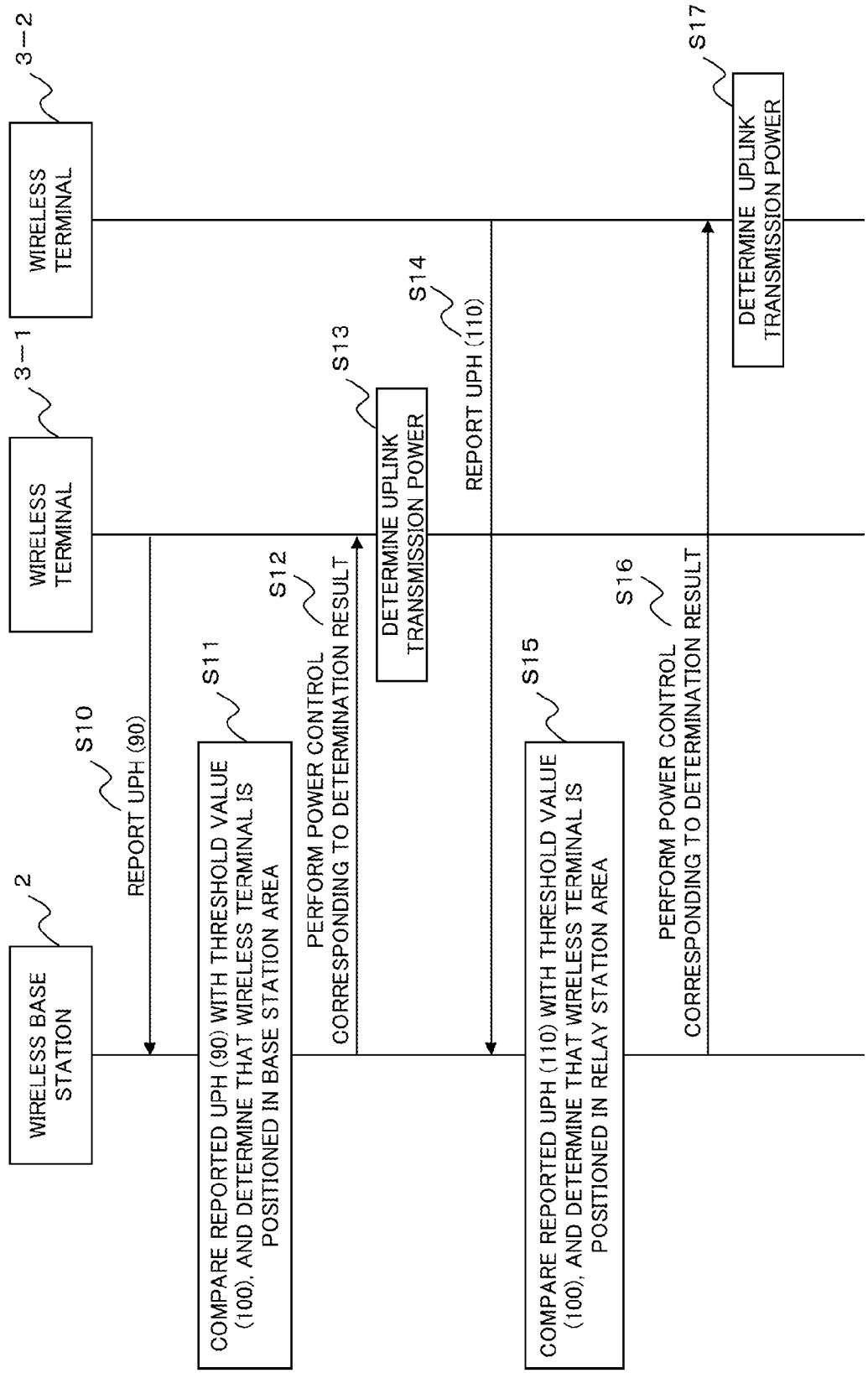
FIG. 8 is a diagram for describing an exemplary transmission power control method according to an embodiment.

As illustrated in FIG. 8, the wireless terminal 3-1 positioned within the base station area 5 reports the UPH (for example, 90 [dB]) to the wireless base station 2 periodically or non-periodically (step S10).

The wireless base station 2 compares the UPH (for example, 90 [dB]) reported from the wireless terminal 3-1 with a predetermined threshold value (for example, 100 [dB]), and determines that the wireless terminal 3-1 stays in the base station area 5 since the UPH reported from the wireless terminal 3-1 is less than the threshold value (step S11).

Then, as illustrated in FIG. 6 or 7, the wireless base station 2 performs the normal closed loop transmission power control on the wireless terminal 3-1 (step S12), and the wireless terminal 3-1 is subjected to the transmission power control performed by the wireless base station 2, and determines (controls) uplink transmission power of its own station 3-1 (step S13).

Meanwhile, the wireless terminal 3-2 positioned within the relay station area 6 reports the UPH (for example, 110 [dB]) to the wireless base station 2 periodically or non-periodically (step S14).

The wireless base station 2 compares the UPH (for example, 110 [dB]) reported from the wireless terminal 3-2 with a predetermined threshold value (for example, 100 [dB]), and determines that the wireless terminal 3-2 stays in the relay station area 6 since the UPH reported from the wireless terminal 3-2 is equal to or larger than the threshold value (step S15).

Then, as illustrated in FIG. 6 or 7, the wireless base station 2 transmits the TPC command fixed to the value of "0" to the wireless terminal 3-2 regardless of the UL-SIR value or the target SIR value, or sets the target SIR for the wireless terminal 3-2 to be smaller than the target SIR or the like for the wireless terminal 3-1, and then performs the closed loop transmission power control (step S16), and the wireless terminal 3-2 is subjected to the transmission power control performed by the wireless base station 2, and determines (controls) the uplink transmission power of its own station 3-2 (step S17).

As described above, in the present example, the wireless base station 2 changes the transmission power control method for the wireless terminal 3 according to the serving area of the wireless terminal 3, that is, according to whether the wireless terminal 3 is connected to its own station 2 through the relay station 4 or not. Specifically, for example, since the uplink transmission power of the wireless terminal 3-2 positioned within the relay station area 6 is hard to increase, even when the transmission signal from the wireless terminal 3 is amplified and relay-transmitted by the relay station 4, it is possible to suppress interference on a surrounding area or a device therearound. Further, it is also possible to reduce the power consumption of the wireless terminal 3.

[2] Explanation of First Modified Example

The above embodiment has been described in connection with the example in which the wireless base station 2 changes the transmission power control method based on the UPH value reported from the wireless terminal 3, but for example, the wireless base station 2 may change the transmission power control method based on a UPH change amount of the wireless terminal 3.

As described above, generally, the UPH reported from the wireless terminal 3 positioned within the base station area 5 to the wireless base station 2 has a relatively small value, but the UPH reported from the wireless terminal 3 positioned within the relay station area 6 to the wireless base station 2 has a relatively large value.

For this reason, when the wireless terminal 3 moved from the base station area 5 to the relay station area 6 or when the wireless terminal 3 moved from the relay station area 6 to the base station area 5, the UPH change amount calculated based on the UPH reported from each area is larger than the UPH change amount calculated based on each UPH reported when the wireless terminal 3 keep staying in the base station area 5 or the relay station area 6.

In this regard, for example, the determiner 24 of the present example is operable to calculate a UPH change amount based on a plurality of UPH values reported from the wireless terminal 3 periodically or non-periodically, to compare the change amount with a predetermined threshold value (a second threshold value), and to determine that the serving area of the wireless terminal 3 does not change when the change amount is less than the threshold value, and determine that the serving area of the wireless terminal 3 has changed when the change amount is equal to or higher than the threshold value.

In the example illustrated in FIG. 9, for example, the determiner 24 determine that the serving area of the wireless terminal 3 does not change when the UPH change amount calculated based on a plurality of UPH values reported from the wireless terminal 3 periodically or non-periodically is less than 10 [dB], and determine that the serving area of the wireless terminal 3 has changed when the change amount is equal to or larger than 10 [dB].

Even in the present example, the determination result of the determiner 24 is notified to the controller 25, and the controller 25 performs the transmission power control according to the determination result of the determiner 24 on the wireless terminal 3.

An exemplary operation of the wireless communication system 1 according to the present example will be described with reference to FIG. 10. In the example illustrated in FIG. 10, the relay station 4 is not illustrated, but communication between the wireless base station 2 and the wireless terminal 3-2 is relayed through the relay station 4.

Figure 10:
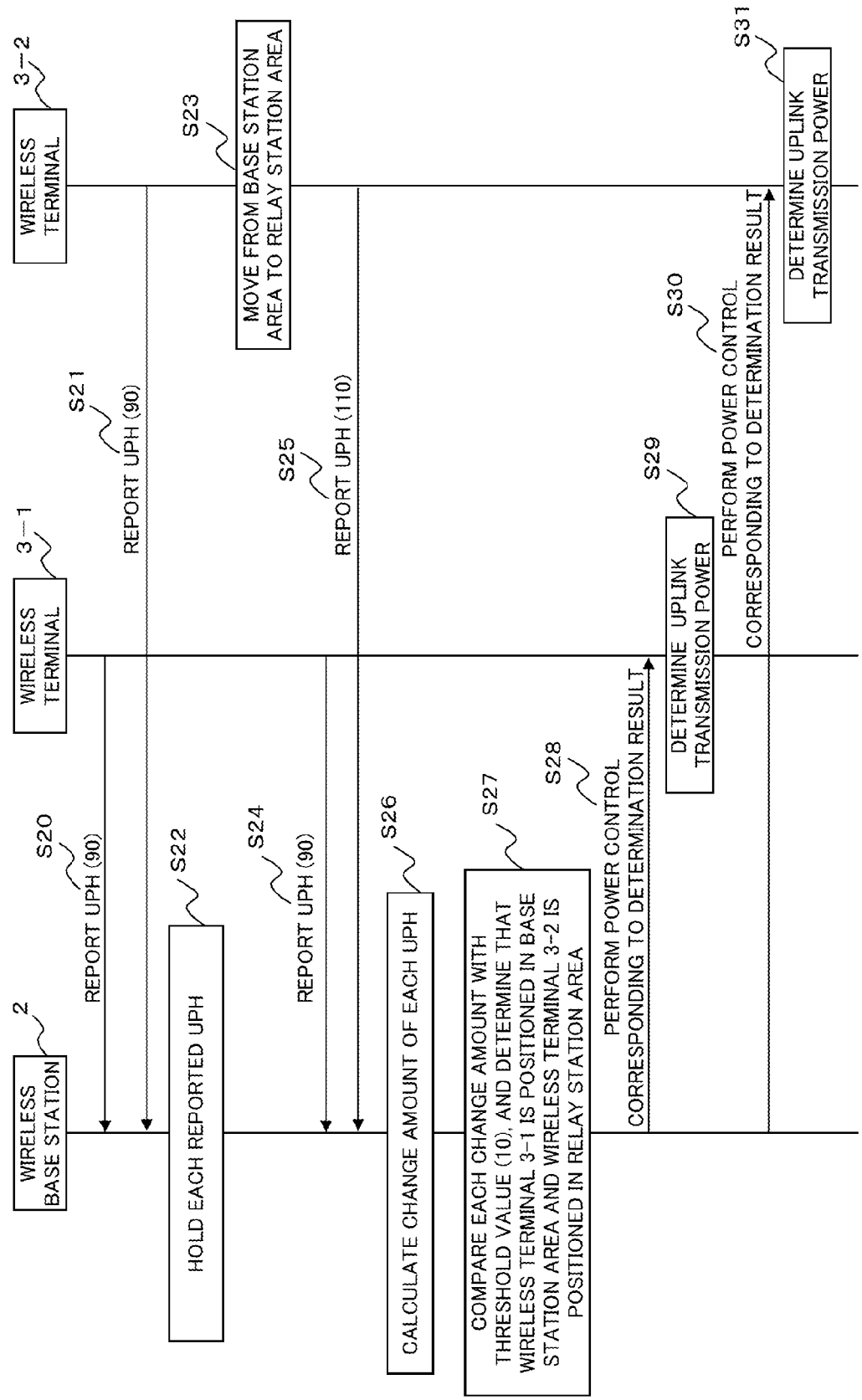
FIG. 10 is a diagram for describing an exemplary transmission power control method according to the first modified example.

As illustrated in FIG. 10, the wireless terminal 3-1 positioned within the base station area 5 reports the UPH (for example, 90 [dB]) to the wireless base station 2 periodically or non-periodically (step S20).

At this time, the wireless terminal 3-2 positioned within the base station area 5 reports the UPH (for example, 90 [dB]) to the wireless base station 2 periodically or non-periodically (step S21) as well.

The wireless base station 2 stores the UPH values reported from the wireless terminals 3-1 and 3-2 in an internal or external storage device (which is not illustrated in FIG. 4) of its own station 2 (step S22).

At this time, for example, when the wireless terminal 3-1 keeps staying in the base station area 5 and the wireless terminal 3-2 moves from the base station area 5 in which the wireless terminal 3-1 has stayed until then to the relay station area 6 (step S23), the UPH (for example, 90 [dB]) is reported from the wireless terminal 3-1 to the wireless base station 2 (step S24), but the UPH (for example, 110 [dB]) is reported from the wireless terminal 3-2 to the wireless base station 2 (step S25).

The wireless base station 2 obtains the difference between the UPH value (90 [dB]) reported from the wireless terminal 3-1 in step S20 and the UPH value (90 [dB]) reported from the wireless terminal 3-1 in step S24 to calculate a UPH change amount (0 [dB]) on the wireless terminal 3-1 (step S26).

Further, the wireless base station 2 obtains the difference between the UPH value (90 [dB]) reported from the wireless terminal 3-2 in step S21 and the UPH value (110 [dB]) reported from the wireless terminal 3-2 in step S25 to calculate a UPH change amount (20 [dB]) on the wireless terminal 3-2 (step S26).

Then, the wireless base station 2 compares UPH change amount (0 [dB]) on the wireless terminal 3-1 with a predetermined threshold value (for example, 10 [dB]), and determines that the serving area of the wireless terminal 3-1 does not changed since the UPH change amount on the wireless terminal 3-1 is less than the threshold value (step S27). At this time, based on the fact that the UPH value (90 [dB]) reported from the wireless terminal 3-1 in step S20 is less than another threshold value (for example, 100 [dB]), the wireless base station 2 can detect that the serving area of the wireless terminal 3-1 was the base station area 5 and detect that the wireless terminal 3-1 keeps staying in the base station area 5.

Further, the wireless base station 2 compares the UPH change amount (20 [dB]) on the wireless terminal 3-2 with a predetermined threshold value (for example, 10 [dB]), and determines that the serving area of the wireless terminal 3-2 has been changed since the UPH change amount on the wireless terminal 3-2 is equal to or larger than the threshold value (step S27). At this time, based on the fact that the UPH value (90 [dB]) reported from the wireless terminal 3-2 (step S21) is less than another threshold value (for example, 100 [dB]), the wireless base station 2 can detect that the serving area of the wireless terminal 3-2 was the base station area 5 and thus detect the wireless terminal 3-2 has moved from the base station area 5 to the relay station area 6.

Then, as illustrated in FIG. 6 or 7, the wireless base station 2 performs the normal the closed loop transmission power control on the wireless terminal 3-1 (step S28), and the wireless terminal 3-1 is subjected to the transmission power control performed by the wireless base station 2, and determines (controls) the uplink transmission power of its own station 3-1 (step S29).

Meanwhile, as illustrated in FIG. 6 or 7, the wireless base station 2 transmits the TPC command fixed to the value of "0" to the wireless terminal 3-2 regardless of the UL-SIR value or the target SIR value, or sets the target SIR for the wireless terminal 3-2 to be smaller than the target SIR for the wireless terminal 3-1, and then performs the closed loop transmission power control (step S30), and the wireless terminal 3-2 is subjected to the transmission power control performed by the wireless base station 2, determines (controls) the uplink transmission power of its own station 3-2 (step S31).

As described above, according to the present example, even when the wireless base station 2 changes the transmission power control method based on the UPH change amount reported from the wireless terminal 3, the same effects as in the aforementioned embodiment can be achieved.

[3] Explanation of Second Modified Example

The above embodiment and the first modified example have been described in connection with the example in which the wireless base station 2 changes the transmission power control method using the UPH reported from the wireless terminal 3, but for example, the wireless base station 2 may change the transmission power control method based on a delay time of a signal received from the wireless terminal 3.

For example, when a signal is relay-processed by the relay station 4, a delay time (hereinafter, also referred to simply as a "relay processing delay time") according to the relay process occurs. Generally, the relay processing delay time is larger than a transmission delay time occurring between the wireless base station 2 and the wireless terminal 3-1 positioned within the base station area 5.

In this regard, for example, the baseband signal processor 23 of the present example requests the wireless terminal 3 to transmit a response, calculates a delay time based on a time taken from the request until the actual reception of the response, and notifies the determiner 24 of the delay time.

Further, for example, the determiner 24 of the present example may compare the calculated delay time with a predetermined threshold value (a third threshold value), determine that the serving area of the wireless terminal 3 is in the base station area 5 when the delay time is less than the threshold value, and determine that the serving area of the wireless terminal 3 is in the relay station area 6 when the delay time is equal to or larger than the threshold value.

In the example illustrated in FIG. 11, for example, the determiner 24 determines that the staying area of the wireless terminal 3 is in the base station area 5 when the delay time for the wireless terminal 3 is less than 20 [μsec], and determines that the staying area of the wireless terminal 3 is in the relay station area 6 when the delay time is equal to or larger than 20 [μsec].

Even in the present example, the determination result of the determiner 24 is notified to the controller 25, and the controller 25 performs the transmission power control according to the determination result of the determiner 24 on the wireless terminal 3.

An exemplary operation of the wireless communication system 1 according to the present example will be described with reference to FIG. 12. In the example illustrated in FIG. 12, the relay station 4 is not illustrated, but communication between the wireless base station 2 and the wireless terminal 3-2 is relayed through the relay station 4.

Figure 12:
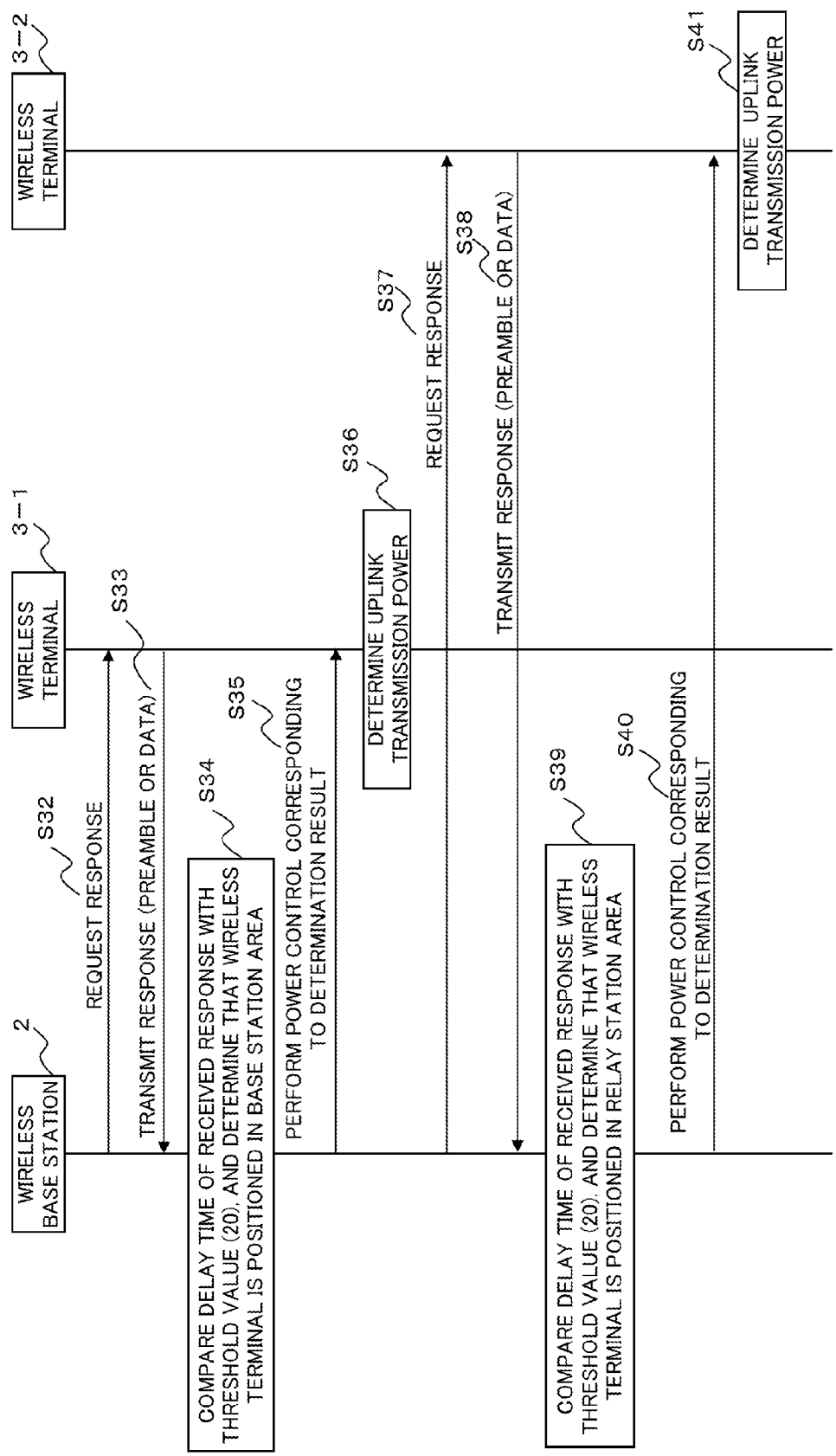
FIG. 12 is a diagram for describing an exemplary transmission power control method according to the second modified example.

As illustrated in FIG. 12, the wireless base station 2 first requests the wireless terminal 3-1 to transmit a response (step S32).

The wireless terminal 3-1 transmits a response in response to the request from the wireless base station 2 (step S33). The response may be a preamble or any kind of data. In other words, for example, a request signal and a response signal normally transceived between the wireless base station 2 and the wireless terminal 3 may be used as the request and the response.

Then, after requesting the wireless terminal 3-1 to transmit the response in step S32, the wireless base station 2 calculates a delay time based on a time taken from the request until the actual reception of the response (step S33), compares the delay time with a predetermined threshold value (for example, 20 [μsec]), and determines that the staying area of the wireless terminal 3-1 is in the base station area 5 since the delay time on the response from the wireless terminal 3-1 is less than the threshold value (step S34).

Then, as illustrated in FIG. 6 or 7, the wireless base station 2 performs the normal the closed loop transmission power control on the wireless terminal 3-1 (step S35), and the wireless terminal 3-1 is subjected to the transmission power control performed by the wireless base station 2, and determines (controls) the uplink transmission power of its own station 3-1 (step S36).

Further, the wireless base station 2 requests the wireless terminal 3-2 to transmit the response (step S37).

The wireless terminal 3-2 transmits a response in response to the request from the wireless base station 2 (step S38). The response may be a preamble or any kind of data. In other words, for example, a request signal and a response signal normally transceived between the wireless base station 2 and the wireless terminal 3 may be used as the request and the response.

Then, after requesting the wireless terminal 3-2 to transmit the response in step S37, the wireless base station 2 calculates a delay time based on a time taken from the request until the actual reception of the response (step S38). At this time, since the request directed to the wireless terminal 3-2 and the response transmitted from the wireless terminal 3-2 are subjected to the relay process performed by the relay station 4, the delay time on the wireless terminal 3-2 is larger than the delay time on the wireless terminal 3-1.

The wireless base station 2 compares the delay time on the wireless terminal 3-2 with a predetermined threshold value (for example, 20 [μsec]), and determines that the staying area of the wireless terminal 3-2 is in the relay station area 6 since the delay time on the response transmitted from the wireless terminal 3-2 is equal to or larger than the threshold value (step S39).

Then, as illustrated in FIG. 6 or 7, the wireless base station 2 transmits the TPC command fixed to the value of "0" to the wireless terminal 3-2 regardless of the UL-SIR value or the target SIR value, or sets the target SIR for the wireless terminal 3-2 to be smaller than the target SIR for the wireless terminal 3-1, and then performs the closed loop transmission power control (step S40), and the wireless terminal 3-2 is subjected to the transmission power control performed by the wireless base station 2, determines (controls) the uplink transmission power of its own station 3-2 (step S41).

As described above, in the present example, even when the wireless base station 2 changes the transmission power control method based on the delay time of the signal received from the wireless terminal 3, the same effects as in the aforementioned embodiment and the first modified example can be achieved.

[4] Explanation of Third Modified Example

Further, for example, the wireless base station 2 may change the transmission power control method based on both of the UPH value reported from the wireless terminal 3 and the delay time of the signal received from the wireless terminal 3.

For example, the baseband signal processor 23 of the present example calculates a delay time based on a time taken until the UPH is actually reported after the wireless terminal 3 is requested to report the UPH, and notifies the determiner 24 of the delay time, and acquires a reported UPH value, and notifies the determiner 24 of the reported UPH value.

Further, for example, the determiner 24 of the present example compares the calculated delay time with a predetermined threshold value (third threshold value), compares the acquired UPH value with a predetermined threshold value (first threshold value), and determines the staying area of the wireless terminal 3 according to both of the comparison results.

In an example illustrated in FIG. 13, for example, the determiner 24 determines that the staying area of the wireless terminal 3 is in the base station area 5 when the UPH value reported from the wireless terminal 3 is less than 100 [dB] and the delay time on the wireless terminal 3 is less than 20 [μsec], and determines that the staying area of the wireless terminal 3 is in the relay station area 6 when the UPH value reported from the wireless terminal 3 is less than 100 [dB] and the delay time on the wireless terminal 3 is equal to or larger than 20 [μsec].

Further, in the example illustrated in FIG. 13, for example, the determiner 24 determines that the staying area of the wireless terminal 3 is in the relay station area 6 when the UPH value reported from the wireless terminal 3 is equal to or larger than 100 [dB] and the delay time on the wireless terminal 3 is less than 20 [μsec], and determines that the staying area of the wireless terminal 3 is in the relay station area 6 when the UPH value reported from the wireless terminal 3 is equal to or larger than 100 [dB] and the delay time on the wireless terminal 3 is equal to or larger than 20 [μsec].

Even in the present example, the determination result of the determiner 24 is notified to the controller 25, and the controller 25 performs the transmission power control according to the determination result of the determiner 24 on the wireless terminal 3.

An exemplary operation of the wireless communication system 1 according to the present example will be described with reference to FIG. 14. In the example illustrated in FIG. 14, the relay station 4 is not illustrated, but communication between the wireless base station 2 and the wireless terminal 3-2 is relayed through the relay station 4.

Figure 14:
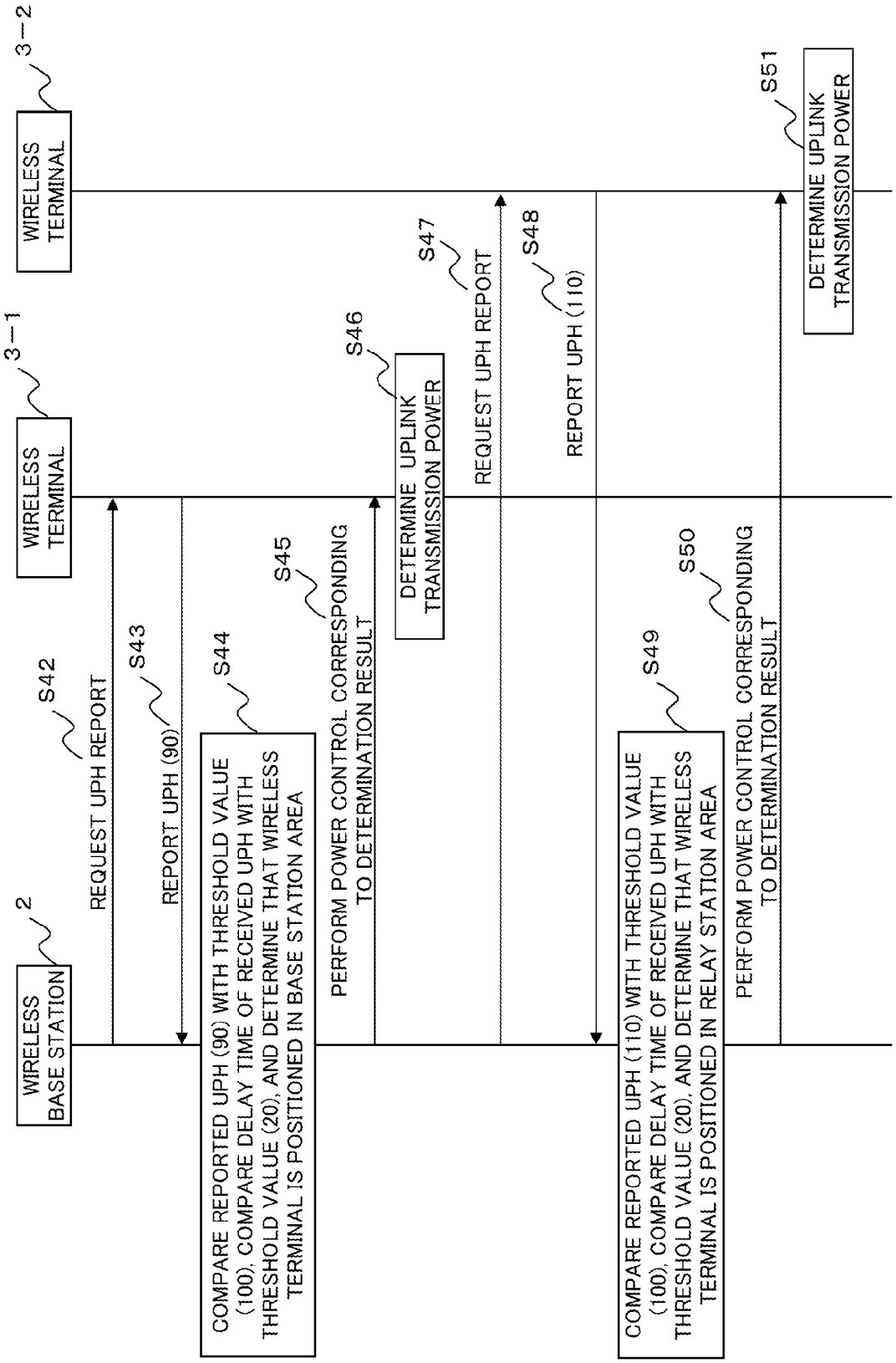
FIG. 14 is a diagram for describing an exemplary transmission power control method according to the third modified example.

As illustrated in FIG. 14, the wireless base station 2 first requests the wireless terminal 3-1 to report a UPH (step S42).

The wireless terminal 3-1 reports the UPH (for example, 90 [dB]) in response to the request from the wireless base station 2 (step S43).

Then, the wireless base station 2 compares the UPH (for example, 90 [dB]) reported from the wireless terminal 3-1 with a predetermined threshold value (for example, 100 [dB]), calculates a delay time based on a time taken until the UPH is actually reported in step S43 after the wireless terminal 3-1 is requested to report the UPH in step S42, and compares the delay time with a predetermined threshold value (for example, 20 [μsec]). At this time, since the UPH value reported from the wireless terminal 3-1 is less than 100 [dB] and the delay time for the wireless terminal 3-1 is less than 20 [μsec], the wireless base station 2 determines that the wireless terminal 3-1 stays in the base station area 5 (step S44).

Then, as illustrated in FIG. 6 or 7, the wireless base station 2 performs the normal the closed loop transmission power control on the wireless terminal 3-1 (step S45), and the wireless terminal 3-1 is subjected to the transmission power control performed by the wireless base station 2, and determines (controls) the uplink transmission power of its own station 3-1 (step S46).

Further, the wireless base station 2 requests the wireless terminal 3-2 to report the UPH (step S47).

The wireless terminal 3-2 reports the UPH (for example, 110 [dB]) in response to the request from the wireless base station 2 (step S48).

Then, the wireless base station 2 compares the UPH (for example, 110 [dB]) reported from the wireless terminal 3-2 with a predetermined threshold value (for example, 100 [dB]), calculates a delay time based on a time taken until the UPH is actually reported in step S48 after the wireless terminal 3-2 is requested to report the UPH in step S47, and compares the delay time with a predetermined threshold value (for example, 20 [μsec]). At this time, since the UPH value reported from the wireless terminal 3-2 is equal to or larger than 100 [dB] and the delay time for the wireless terminal 3-2 is equal to or larger than 20 [μsec], the wireless base station 2 determines that the wireless terminal 3-2 stays in the relay station area 6 (step S49).

Then, as illustrated in FIG. 6 or 7, the wireless base station 2 transmits the TPC command fixed to the value of "0" to the wireless terminal 3-2 regardless of the UL-SIR value or the target SIR value, or sets the target SIR for the wireless terminal 3-2 to be smaller than the target SIR for the wireless terminal 3-1, and then performs the closed loop transmission power control (step S50), and the wireless terminal 3-2 is subjected to the transmission power control performed by the wireless base station 2, and determines (controls) the uplink transmission power of its own station 3-2 (step S51).

As described above, according to the present example, since the wireless base station 2 changes the transmission power control method based on the UPH value reported from the wireless terminal 3 and the delay time of the signal received from the wireless terminal 3, the same effects as in the aforementioned embodiment and the first and second modified examples can be achieved surely.

[5] Explanation of Fourth Modified Example

Further, for example, the wireless base station 2 may change the transmission power control method based on information (hereinafter, also referred to simply as "positional information") related to the position of the wireless terminal 3 reported from the wireless terminal 3.

In the wireless communication system 1, the wireless terminal 3 reports the positional information of its own station 3 to the wireless base station 2 periodically or non-periodically. For example, the positional information is calculated based on GPS radio waves received by the wireless terminal 3.

In this regard, for example, the wireless base station 2 is operable to store information (hereinafter, also referred to simply as "area information") related to a range of the base station area 5 and a range of the relay station area 6, to compare the positional information reported from the wireless terminal 3 with the area information, and to determine that the position of the wireless terminal 3 determined based on the positional information is included in the base station area 5 or the relay station area 6. For example, the positional information of the wireless terminal 3 may include information such as the latitude, the longitude, and the altitude. For example, the area information may be generated by measuring a radio wave radiated from each device through a radio wave measuring vehicle when the wireless base station 2, the relay station 4, or the like is installed. Further, the area information may be configured as a two-dimensional or three-dimensional area map.

Thus, for example, the baseband signal processor 23 of the present example acquires the positional information of the wireless terminal 3 from the signal transmitted from the wireless terminal 3, and notifies the determiner 24 of the positional information of the wireless terminal 3.

Further, for example, the determiner 24 of the present example is operable to compare the positional information of the wireless terminal 3 notified from the baseband signal processor 23 with the area information and to determine whether the wireless terminal 3 stays in the base station area 5 or the relay station area 6.

Figure 15:
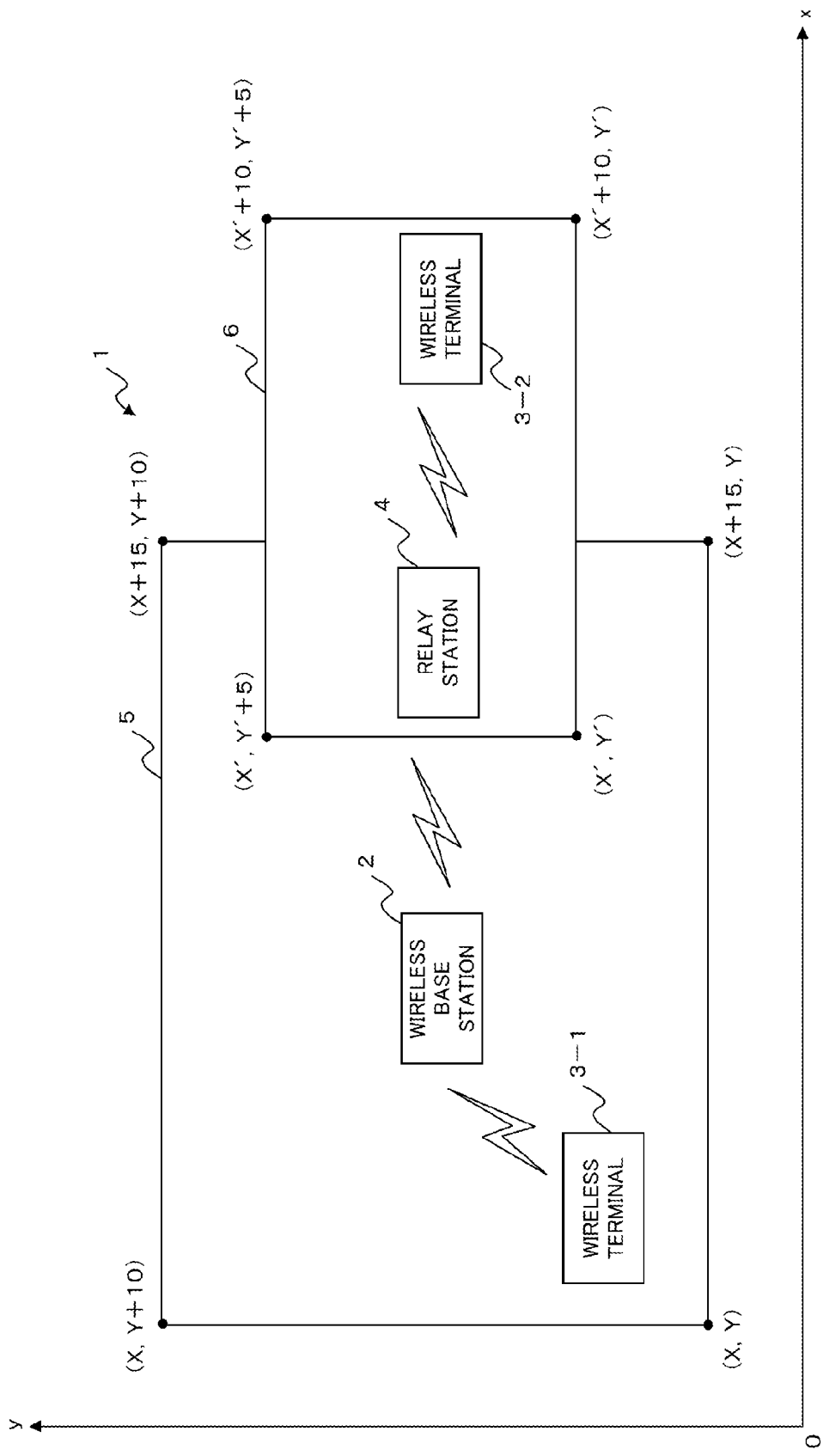
FIG. 15 is a diagram for describing an exemplary area determination method according to a fourth modified example.

Here, FIG. 15 illustrates an area map of the base station area 5 and the relay station area 6. In the example of FIG. 15, for simple description, the base station area 5 and the relay station area 6 are represented by a rectangular shape, but this is mere an example, and the forth modification is not limited to this example. Further, in the example of FIG. 15, the area maps of the base station area 5 and the relay station area 6 are represented in a two-dimensional shape, but the area maps of the base station area 5 and the relay station area 6 may be represented in a three-dimensional shape. Furthermore, in the example of FIG. 15, for simple description, the positional information is represented by the xy coordinate system instead of the latitude and the longitude, but this is merely an example, and the forth modification is not limited to this example.

In the example illustrated in FIG. 15, the base station area 5 is represented by a rectangular having (X, Y), (X, Y+10), (X+15, Y+15), and (X+15, Y) as vertexes, and the relay station area 6 is represented by a rectangular having (X', Y'), (X', Y'+5), (X'+10, Y'+5), and (X'+10, Y') as vertexes. Further, a rectangular area having (X', Y'), (X', Y'+5), (X+15, Y'+5), and (X+15, Y') as vertexes is an overlapping area of the base station area 5 and the relay station area 6, but the overlapping area is dealt as a part of the relay station area 6.

FIG. 16 illustrates the area map of FIG. 15 in a table form.

In the example illustrated in FIG. 16, for example, the determiner 24 first determines whether the positional information reported from the wireless terminal 3 is positioned within the rectangular range having (X', Y'), (X', Y'+5), (X'+10, Y'+5), and (X'+10, Y') as vertexes.

Then, when the positional information reported from the wireless terminal 3 is determined to be positioned within the rectangular range having (X', Y'), (X', Y'+5), (X'+10, Y'+5), and (X'+10, Y') as vertexes, the determiner 24 determines that the wireless terminal 3 stays in the relay station area 6.

Meanwhile, when the positional information reported from the wireless terminal 3 is determined not to be positioned within the rectangular range having (X', Y'), (X', Y'+5), (X'+10, Y'+5), and (X'+10, Y') as vertexes, the determiner 24 then determines whether the positional information reported from the wireless terminal 3 is positioned within the rectangular range having (X, Y), (X, Y+10), (X+15, Y+15), and (X+15, Y) as vertexes.

Then, when the positional information reported from the wireless terminal 3 is determined to be positioned within the rectangular range having (X, Y), (X, Y+10), (X+15, Y+15), and (X+15, Y) as vertexes, the determiner 24 determines that the wireless terminal 3 stays in the base station area 5.

As described above, the determination of whether the wireless terminal 3 is positioned in the relay station area 6 is performed before the determination of whether the wireless terminal 3 is positioned in the base station area 5, and thus the determination can be appropriately performed when the wireless terminal 3 is positioned in the overlapping area between the base station area 5 and the relay station area 6.

Even in the present example, the determination result of the determiner 24 is notified to the controller 25, and the controller 25 performs the transmission power control according to the determination result of the determiner 24 on the wireless terminal 3.

An exemplary operation of the wireless communication system 1 according to the present example will be described with reference to FIG. 17. In the example illustrated in FIG. 17, the relay station 4 is not illustrated, but communication between the wireless base station 2 and the wireless terminal 3-2 is relayed through the relay station 4.

Figure 17:
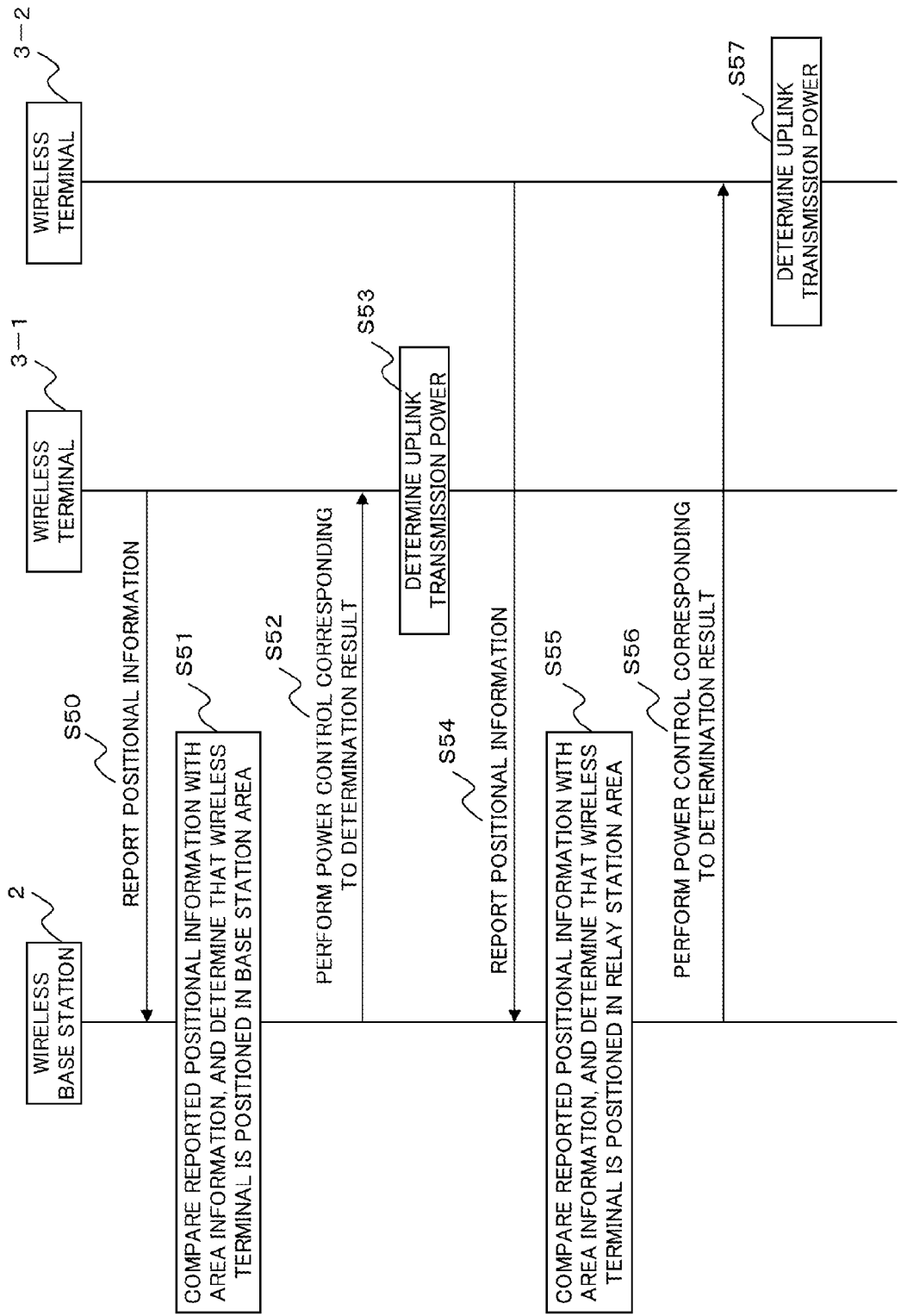
FIG. 17 is a diagram for describing an exemplary transmission power control method according to the fourth modified example.

As illustrated in FIG. 17, the wireless terminal 3-1 reports the positional information of its own station 3-1 to the wireless base station 2 periodically or non-periodically (step S50).

The wireless base station 2 compares the positional information reported from the wireless terminal 3-1 with the area map, and determines that the wireless terminal 3-1 stays in the base station area 5 since the positional information reported from the wireless terminal 3-1 is included in the base station area 5 rather than the relay station area 6 (step S51).

Then, as illustrated in FIG. 6 or 7, the wireless base station 2 performs the normal the closed loop transmission power control on the wireless terminal 3-1 (step S52), and the wireless terminal 3-1 is subjected to the transmission power control performed by the wireless base station 2, and determines (controls) the uplink transmission power of its own station 3-1 (step S53).

Meanwhile, the wireless terminal 3-2 reports the positional information of its own station 3-2 to the wireless base station 2 periodically or non-periodically (step S54).

The wireless base station 2 compares the positional information reported from the wireless terminal 3-2 with the area map, and determines that the wireless terminal 3-2 stays in the relay station area 6 since the positional information reported from the wireless terminal 3-2 is included in the relay station area 6 rather than the base station area 5 (step S55).

Then, as illustrated in FIG. 6 or 7, the wireless base station 2 transmits the TPC command fixed to the value of "0" to the wireless terminal 3-2 regardless of the UL-SIR value or the target SIR value, or sets the target SIR for the wireless terminal 3-2 to be smaller than the target SIR for the wireless terminal 3-1, and then performs the closed loop transmission power control (step S56), and the wireless terminal 3-2 is subjected to the transmission power control performed by the wireless base station 2, and determines (controls) the uplink transmission power of its own station 3-2 (step S57).

As described above, according to the present example, the wireless base station 2 changes the transmission power control method based on the positional information reported from the wireless terminal 3, and thus the same effects as in the aforementioned embodiment and the first to third modified examples can be achieved surely.

[6] Exemplary Hardware Configuration

Figure 18:
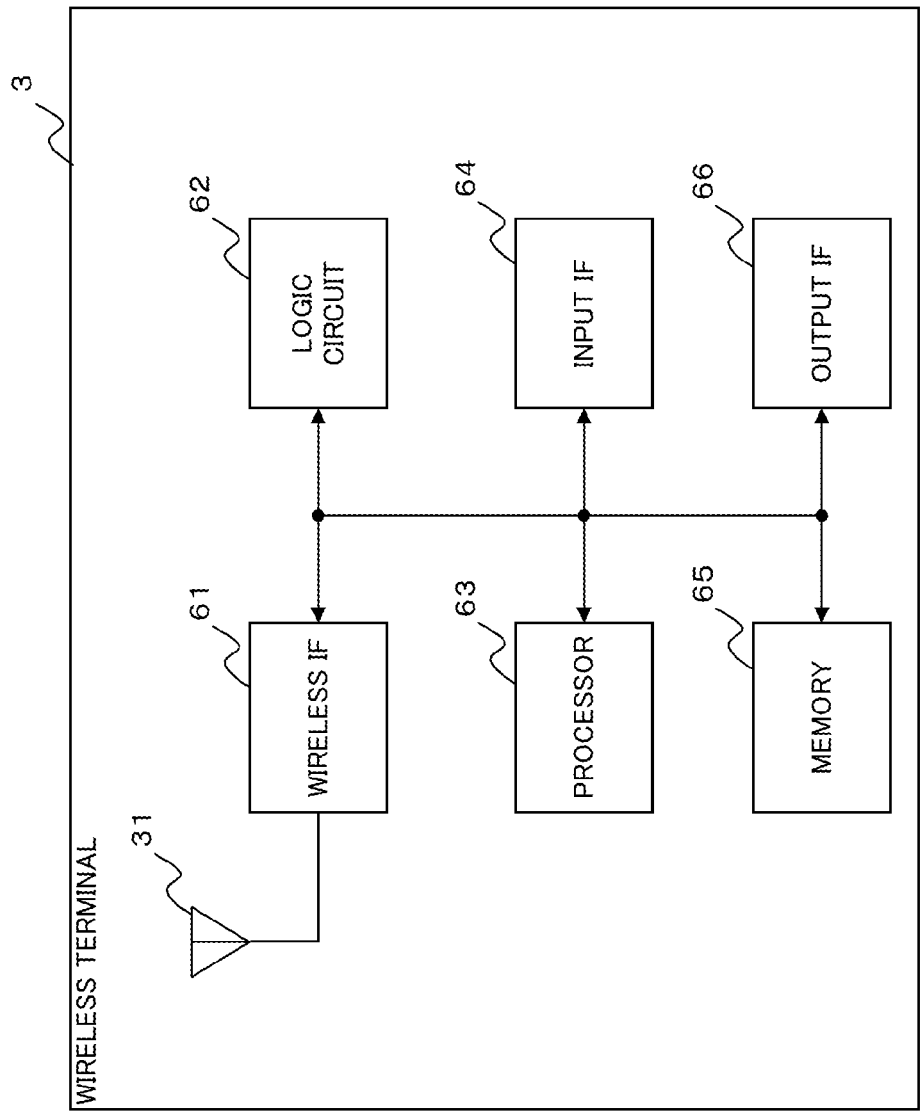
FIG. 18 is a diagram illustrating an exemplary hardware configuration of the wireless terminal illustrated in FIG. 1.

FIG. 18 illustrates an exemplary hardware configuration of the wireless terminal 3.

The wireless terminal 3 includes, for example, an antenna 31, a wireless interface (IF) 61, a logic circuit 62, a processor 63, an input IF 64, a memory 65, and an output IF 66, as illustrated in FIG. 18.

For example, the wireless IF 61 is an interface device used to perform wireless communication with a communication device such as the wireless base station 2 or the relay station 4 through the antenna 31.

The logic circuit 62 is an electronic circuit operable to perform a logical operation, and includes, for example, a large scale integration (LSI), a field programmable gate array (FPGA), or the like.

The processor 63 is a device operable to process data, and includes, for example, a central processing unit (CPU), a digital signal processor (DSP), or the like.

The input IF 64 is a device operable to perform an input operation, and includes, for example, an operation button, a microphone, or the like.

The memory 65 is a device which stores data, and includes, for example, a read only memory (ROM), a random access memory (RAM), or the like.

The output IF 66 is a device operable to perform an output operation, and includes, for example, a display, a speaker, or the like.

For example, a correspondence relationship of the components of the wireless terminal 3 illustrated in FIG. 2 and the components of the wireless terminal 3 illustrated in FIG. 18 is as follows.

The wireless IF 61, the logic circuit 62, the processor 63, and the memory 65 correspond to, for example, the transceiver 32, and the logic circuit 62, the processor 63, and the memory 65 correspond to, for example, the processor 33.

Figure 19:
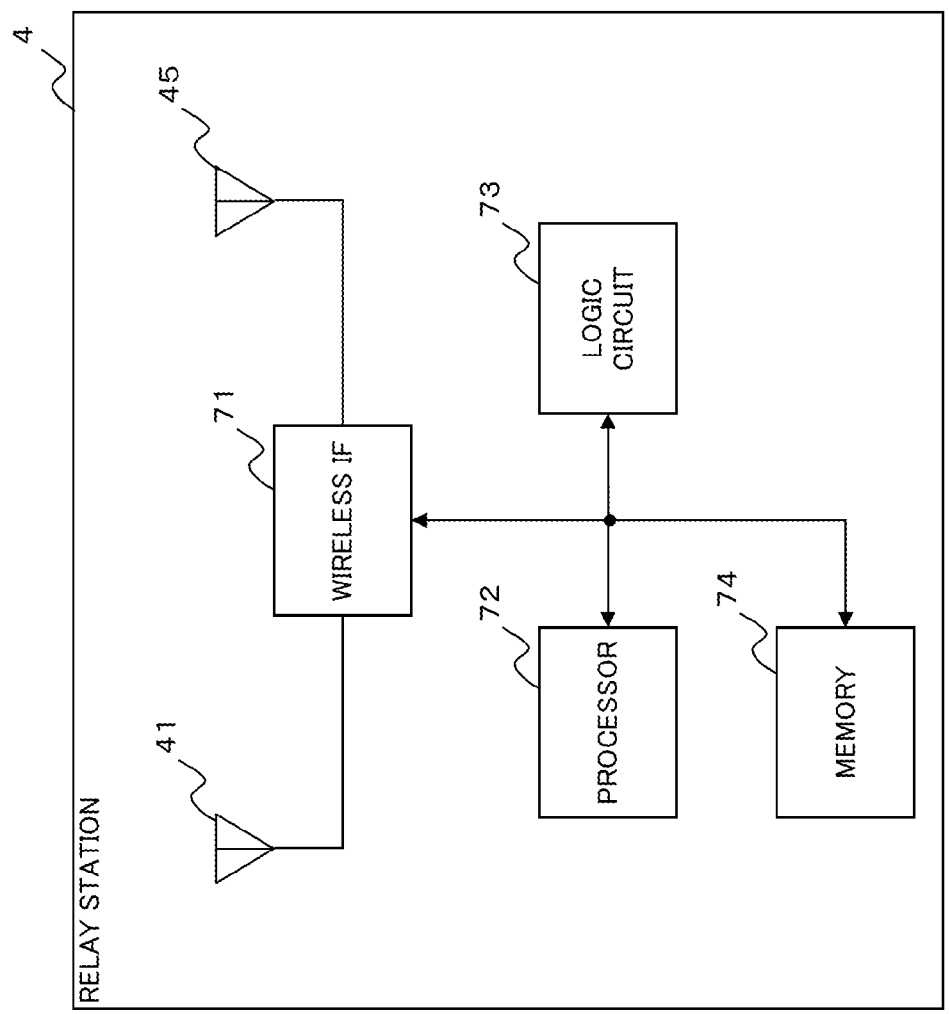
FIG. 19 is a diagram illustrating an exemplary hardware configuration of the relay station illustrated in FIG. 1.

FIG. 19 illustrates an exemplary hardware configuration of the relay station 4.

The relay station 4 includes, for example, a base station directed antenna 41, a terminal directed antenna 45, a wireless IF 71, a processor 72, a logic circuit 73, and a memory 74, as illustrated in FIG. 19.

For example, the wireless IF 71 is an interface device used to perform wireless communication with the wireless base station 2 through the base station directed antenna 41 and perform wireless communication with the wireless terminal 3 through the terminal directed antenna 45.

The processor 72 is a device operable to process data, and includes, for example, a CPU, a DSP, or the like.

The logic circuit 73 is an electronic circuit operable to perform a logical operation, and includes, for example, an LSI, an FPGA, or the like.

The memory 74 is a device which stores data, and includes, for example, a ROM, a RAM, or the like.

For example, a correspondence relationship of the components of the relay station 4 illustrated in FIG. 3 and the components of the relay station 4 illustrated in FIG. 19 is as follows.

The wireless IF 71, the processor 72, the logic circuit 73, and the memory 74 correspond to, for example, the base station directed transceiver 42. The processor 72, the logic circuit 73, and the memory 74 correspond to, for example, the amplification processor 43. The wireless IF 71, the processor 72, the logic circuit 73, and the memory 74 correspond to, for example, the terminal directed transceiver 44.

Figure 20:
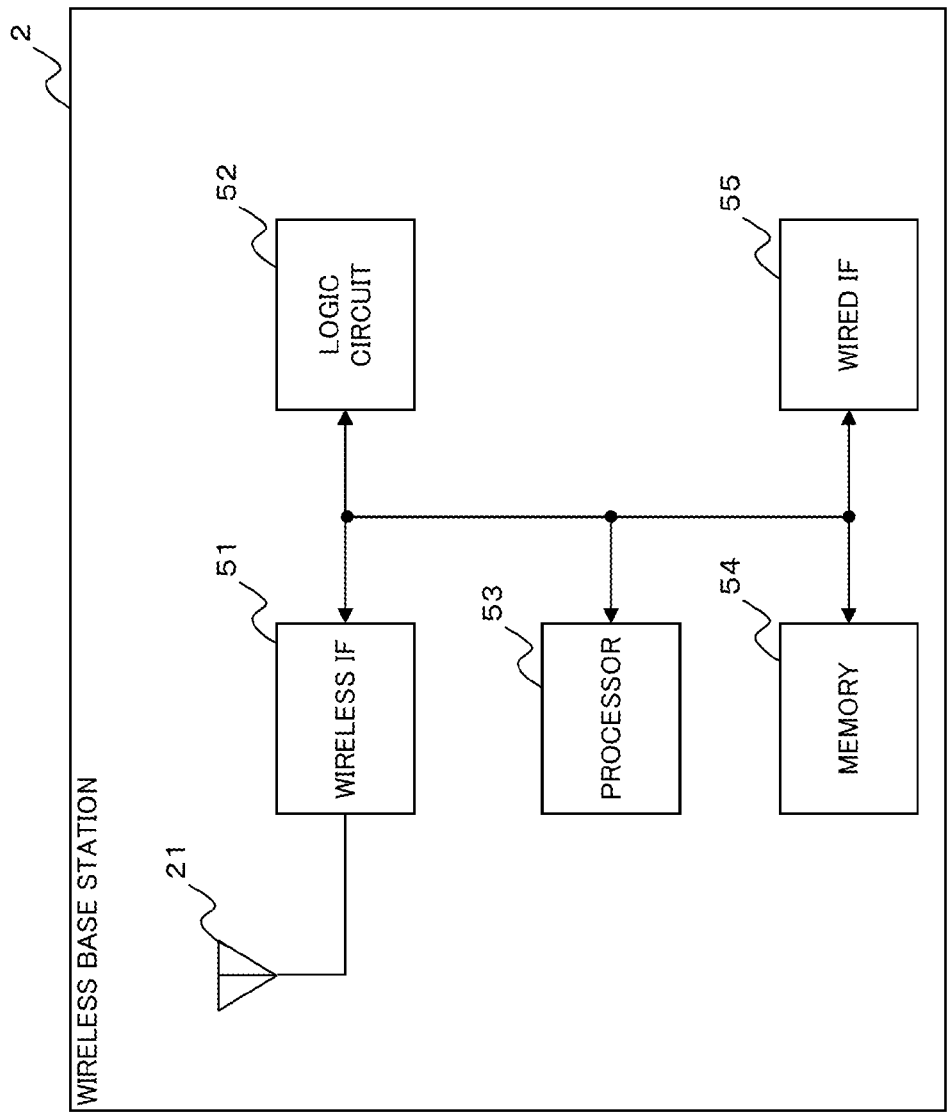
FIG. 20 is a diagram illustrating an exemplary hardware configuration of the wireless base station illustrated in FIG. 1.

FIG. 20 illustrates an exemplary hardware configuration of the wireless base station 2.

The wireless base station 2 includes, for example, an antenna 21, a wireless IF 51, a logic circuit 52, a processor 53, a memory 54, and a wired IF 55, as illustrated in FIG. 20.

For example, the wireless IF 51 is an interface device used to perform wireless communication with a communication device such as the wireless terminal 3 or the relay station 4 through the antenna 21.

The logic circuit 52 is an electronic circuit operable to perform a logical operation, and includes, for example, an LSI, an FPGA, or the like.

The processor 53 is a device operable to process data, and includes, for example, a CPU, a DSP, or the like.

The memory 54 is a device which stores data, and includes, for example, a ROM, a RAM, or the like.

The wired IF 55 is an interface device used to perform wired communication with an external system such as a second wireless base station connected to a network (a so-called backhaul network) at the network side of the wireless communication system 1.

For example, a correspondence relationship of the components of the wireless base station 2 illustrated in FIG. 4 and the components of the wireless base station 2 illustrated in FIG. 20 is as follows.

The wireless IF 51, the logic circuit 52, the processor 53, and the memory 54 correspond to, for example, the transceiver 22, and the logic circuit 52, the processor 53, and the memory 54 correspond to, for example, the baseband signal processor 23, the determiner 24, and the controller 25.

As described all the above, it becomes possible to suppress interference between wireless signals.

Further, it becomes possible to reduce power consumption in a wireless terminal.

[7] Others

In the embodiment and the modified examples described above, the respective components and functions of the wireless base station 2, the wireless terminal 3, and the relay station 4 may be selected as necessary or may be appropriately combined and used. In other words, the respective components and functions may be selected or appropriately combined and used so that the function of the present invention can be implemented.

For example, the wireless base station 2 may combine and use the processes of changing the transmission power control method according to the embodiment and the modified examples described above or may appropriately and selectively use any one of the changing processes according to an installation environment of the wireless communication system 1.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:

1. A wireless base station of a wireless communication system including the wireless base station, a wireless terminal, and a relay station configured to relay a wireless signal transceived between the wireless base station and the wireless terminal, the wireless base station comprising:
    a processor configured to perform a second transmission power control different from a first transmission power control, the first transmission power control being performed on a first wireless terminal connected to the wireless base station without the relay station, the second transmission power control being performed on a second wireless terminal connected to the wireless base station through the relay station; and
    a transmitter configured to transmit a control message according to the second transmission power control to the second wireless terminal,
    wherein the second transmission power control maintains a transmission power of the second wireless terminal regardless of a quality of a wireless signal transmitted from the second wireless terminal by transmitting a transmission power control (TPC) command to the second wireless terminal, the transmitted TPC command being set to "0" to instruct the second wireless terminal to maintain the transmission power of the second wireless terminal.

2. The wireless base station according to claim 1, wherein the first wireless terminal is positioned in a first wireless area provided by the wireless base station and the second wireless terminal is positioned in a second wireless area provided by the relay station.

3. The wireless base station according to claim 2,
wherein the second transmission power control has a characteristic of producing less transmission power increase of the second wireless terminal than the first transmission power control.

4. The wireless base station according to claim 2,
wherein the first transmission power control changes or maintains a transmission power of the first wireless terminal such that a quality of a wireless signal transmitted from the first wireless terminal is brought close to a target quality.

5. The wireless base station according to claim 2, further comprising,
a receiver configured to receive a wireless signal transmitted from a wireless terminal,
wherein the processor determines whether the wireless terminal corresponds to the first wireless terminal or the second wireless terminal based on information related to remaining power of the transmission power of the wireless terminal and included in the wireless signal received by the receiver.

6. The wireless base station according to claim 2, further comprising,
a receiver configured to receive a wireless signal transmitted from a wireless terminal,
wherein the processor determines whether the wireless terminal corresponds to the first wireless terminal or the second wireless terminal based on a delay time of the wireless signal received by the receiver.

7. The wireless base station according to claim 2, further comprising,
a receiver configured to receive a wireless signal transmitted from a wireless terminal,
wherein the processor determines whether the wireless terminal corresponds to the first wireless terminal or the second wireless terminal based on positional information of the wireless terminal included in the wireless signal received by the receiver.

8. The wireless base station according to claim 1,
wherein the second transmission power control has a characteristic of producing less transmission power increase of the second wireless terminal than the first transmission power control.

9. The wireless base station according to claim 1,
wherein the first transmission power control changes or maintains a transmission power of the first wireless terminal such that a quality of a wireless signal transmitted from the first wireless terminal is brought close to a target quality.

10. The wireless base station according to claim 1, further comprising,
a receiver configured to receive a wireless signal transmitted from a wireless terminal,
wherein the processor determines whether the wireless terminal corresponds to the first wireless terminal or the second wireless terminal based on information related to remaining power of the transmission power of the wireless terminal and included in the wireless signal received by the receiver.

11. The wireless base station according to claim 1, further comprising,
a receiver configured to receive a wireless signal transmitted from a wireless terminal,
wherein the processor determines whether the wireless terminal corresponds to the first wireless terminal or the second wireless terminal based on a delay time of the wireless signal received by the receiver.

12. The wireless base station according to claim 1, further comprising,
a receiver configured to receive a wireless signal transmitted from a wireless terminal,
wherein the processor determines whether the wireless terminal corresponds to the first wireless terminal or the second wireless terminal based on positional information of the wireless terminal included in the wireless signal received by the receiver.

13. A wireless communication system, comprising:
a wireless base station;
a wireless terminal; and
a relay station configured to relay a wireless signal transceived between the wireless base station and the wireless terminal,
wherein the wireless base station comprises
a first processor configured to perform a second transmission power control different from a first transmission power control, the first transmission power control being performed on a first wireless terminal connected to the wireless base station without the relay station, the second transmission power control being performed on a second wireless terminal connected to the wireless base station through the relay station, and
a transmitter configured to transmit a control message according to the second transmission power control to the second wireless terminal, and
the second wireless terminal comprises
a receiver configured to receive the control message transmitted from the transmitter, and
a second processor configured to control a transmission power of the second wireless terminal based on the received control message,
wherein the second transmission power control maintains a transmission power of the second wireless terminal regardless of a quality of a wireless signal transmitted from the second wireless terminal by transmitting a transmission power control (TPC) command to the second wireless terminal, the transmitted TPC command being set to "0" to instruct the second wireless terminal to maintain the transmission power of the second wireless terminal.

14. The wireless communication system according to claim 13,
wherein the first wireless terminal is positioned in a first wireless area provided by the wireless base station and the second wireless terminal is positioned in a second wireless area provided the relay station.

15. A transmission power control method of a wireless base station in a wireless communication system including the wireless base station, a wireless terminal, and a relay station configured to relay a wireless signal transceived between the wireless base station and the wireless terminal, the method comprising:
performing a second transmission power control different from a first transmission power control, the first transmission power control being performed on a first wireless terminal connected to the wireless base station without the relay station, the second transmission power control being performed on a second wireless terminal connected to the wireless base station through the relay station; and
transmitting a control message according to the second transmission power control to the second wireless terminal,
wherein the second transmission power control maintains a transmission power of the second wireless terminal regardless of a quality of a wireless signal transmitted from the second wireless terminal by transmitting a transmission power control (TPC) command to the second wireless terminal, the transmitted TPC command being set to "0" to instruct the second wireless terminal to maintain the transmission power of the second wireless terminal.

16. The transmission power control method according to claim 15, wherein the first wireless terminal is positioned in a first wireless area provided by the wireless base station and the second wireless terminal is positioned in a second wireless area provided by the relay station.

\* \* \* \* \*